(12) United States Patent
Guerrera et al.

(10) Patent No.: US 9,288,248 B2
(45) Date of Patent: Mar. 15, 2016

(54) MEDIA SYSTEM WITH LOCAL OR REMOTE RENDERING

(75) Inventors: Enzo Mario Guerrera, Monte Sereno, CA (US); Soenke Schnepel, Luetjensee (DE); Peter Erick Lee, Chelmsford, MA (US); Steven G. Warner, Sunnyvale, CA (US); Boris Alexander Pruessmann, Hamburg (DE); Matthew C. Weagle, Burien, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 712 days.

(21) Appl. No.: 13/291,241

(22) Filed: Nov. 8, 2011

(65) Prior Publication Data

US 2015/0207837 A1    Jul. 23, 2015

(51) Int. Cl.
*H04N 5/76* (2006.01)
*H04L 29/06* (2006.01)
*H04L 29/08* (2006.01)

(52) U.S. Cl.
CPC ............... *H04L 65/60* (2013.01); *H04L 67/10* (2013.01); *H04L 67/42* (2013.01)

(58) Field of Classification Search
USPC .......................................... 715/716; 386/278
See application file for complete search history.

(56) References Cited

U.S. PATENT DOCUMENTS

| 6,766,357 | B1 | 7/2004 | Fandozzi |
| 7,143,357 | B1 | 11/2006 | Snibbe et al. |
| 7,162,697 | B2 | 1/2007 | Markel |
| 7,496,630 | B2 | 2/2009 | Arellano et al. |
| 7,864,186 | B2 | 1/2011 | Robotham et al. |
| 8,385,950 | B1 | 2/2013 | Wagner et al. |
| 8,819,150 | B1 * | 8/2014 | Osinga et al. ................. 709/206 |
| 2001/0004417 | A1 | 6/2001 | Narutoshi et al. |
| 2002/0056119 | A1 | 5/2002 | Moynihan |
| 2002/0091762 | A1 | 7/2002 | Sohn et al. |
| 2002/0188628 | A1 | 12/2002 | Cooper et al. |
| 2004/0221231 | A1 | 11/2004 | Madril, Jr. et al. |
| 2006/0010199 | A1 | 1/2006 | Brailean et al. |
| 2006/0026305 | A1 | 2/2006 | Illowsky et al. |

(Continued)

FOREIGN PATENT DOCUMENTS

| WO | WO-2007066257 A1 | 6/2007 |
| WO | WO-2008011195 A2 | 1/2008 |
| WO | WO-2008144284 A1 | 11/2008 |

OTHER PUBLICATIONS

"U.S. Appl. No. 13/291,249, Response filed Jul. 19, 2013 to Non Final Office Action mailed May 15, 2013", 15 pgs.

(Continued)

*Primary Examiner* — William Tran
(74) *Attorney, Agent, or Firm* — Shook, Hardy & Bacon L.L.P.

(57) ABSTRACT

A media editing system includes one or more machines that are configured to support cloud-based collaborative editing of media by one or more client devices. A machine within the media editing system may be configured to receive a render request for generation of a media frame, determine whether a client device is to generate the media frame, and initiate generation of the media frame. Moreover, a machine within the media editing system may facilitate resolution of conflicts between edits to a particular piece of media. Furthermore, a machine within the media editing system may facilitate provision of convenient access to media from a particular client device to one or more additional client devices.

25 Claims, 16 Drawing Sheets

(56) References Cited

U.S. PATENT DOCUMENTS

| | | |
|---|---|---|
| 2006/0170778 A1 | 8/2006 | Ely et al. |
| 2007/0089151 A1 | 4/2007 | Moore et al. |
| 2007/0136745 A1 | 6/2007 | Garbow et al. |
| 2008/0009272 A1 | 1/2008 | Toledano |
| 2008/0098032 A1 | 4/2008 | Wu |
| 2008/0172455 A1 | 7/2008 | Masucci et al. |
| 2008/0267069 A1 | 10/2008 | Thielman et al. |
| 2008/0284939 A1 | 11/2008 | Lee et al. |
| 2009/0070286 A1 | 3/2009 | Liss et al. |
| 2009/0150797 A1 | 6/2009 | Burkholder et al. |
| 2009/0196570 A1 | 8/2009 | Dudas et al. |
| 2009/0199090 A1 | 8/2009 | Poston et al. |
| 2009/0258594 A1 | 10/2009 | Martin-Cocher et al. |
| 2009/0259623 A1 | 10/2009 | Mooneyham et al. |
| 2009/0327244 A1 | 12/2009 | Rizal |
| 2010/0058354 A1* | 3/2010 | Fein et al. ............... 719/313 |
| 2010/0260468 A1 | 10/2010 | Khatib et al. |
| 2010/0262710 A1 | 10/2010 | Khatib et al. |
| 2010/0278424 A1 | 11/2010 | Warner |
| 2011/0004899 A1* | 1/2011 | Medford ................... 725/32 |
| 2011/0026900 A1 | 2/2011 | Lussier et al. |
| 2011/0029883 A1 | 2/2011 | Lussier et al. |
| 2011/0078246 A1 | 3/2011 | Dittmer-Roche |
| 2011/0138018 A1 | 6/2011 | Raveendran et al. |
| 2011/0276674 A1* | 11/2011 | Jensen-Horne et al. ...... 709/223 |
| 2011/0276881 A1* | 11/2011 | Keng et al. ............... 715/723 |
| 2011/0307442 A1 | 12/2011 | Sharma et al. |
| 2012/0011442 A1 | 1/2012 | Fay et al. |
| 2012/0131178 A1* | 5/2012 | Zhu et al. ................. 709/224 |
| 2012/0210217 A1* | 8/2012 | Abbas et al. ................ 715/716 |
| 2012/0254752 A1* | 10/2012 | Svendsen et al. ........... 715/716 |
| 2012/0259926 A1 | 10/2012 | Lockhart |
| 2012/0331168 A1 | 12/2012 | Chen |
| 2013/0111335 A1* | 5/2013 | Tse et al. ................... 715/255 |
| 2014/0040381 A1 | 2/2014 | Guerrera et al. |
| 2014/0040419 A1 | 2/2014 | Guerrera |
| 2014/0040737 A1 | 2/2014 | Guerrera et al. |

OTHER PUBLICATIONS

"U.S. Appl. No. 13/291,249, Examiner Interview Summary mailed Jun. 17, 2013", 4 pgs.

"U.S. Appl. No. 13/291,249, Non Final Office Action mailed May 15, 2013", 24 pgs.

"U.S. Appl. No. 13/291,249, Notice of Allowance mailed Oct. 15, 2013", 13 pgs.

"U.S. Appl. No. 13/291,257, Response filed Dec. 19, 2013 to Non Final Office Action mailed Oct. 10, 2013", 13 pgs.

"U.S. Appl. No. 13/291,257, Examiner Interview Summary mailed Dec. 11, 2013", 3 pgs.

"U.S. Appl. No. 13/291,257, Non Final Office Action mailed Oct. 10, 2013", 13 pgs.

"Network Rendering in Vegas 5.0 Software", SONY, Revision 1, Updated Jun. 7, 2004, http://download.sonymediasoftware.com/whitepapers/network_rendering.pdf, (Jun. 2004), 13 pgs.

Proskumin, Oleg, "Concurrent Video: Operational Extensions", 6th International Baltic Conference Databases and Information Systems, (2004), 134-144.

\* cited by examiner

MEDIA SYSTEM WITH LOCAL OR REMOTE RENDERING

TECHNICAL FIELD

The subject matter disclosed herein generally relates to the processing of data. Specifically, the present disclosure addresses collaborative media editing systems and methods with local or remote rendering.

BACKGROUND

A device may be used to edit (e.g., modify) media (e.g., media data or media content). For example, a computer may store some media (e.g., a movie having a video track and an audio track), and the computer may execute media editor software (e.g., Adobe Premiere®) that configures the computer to edit the stored media (e.g., by modifying the video track, modifying the audio track, or both). After editing, the edited media may be stored by the computer (e.g., as a modified version of the original media, a replacement for the original media, or as new media).

Examples of modifications that may be applied to media include various effects and various forms of compositing. Examples of audio effects include delays (e.g., echoes), reverb, equalization, compression, distortion, stereo pan, or any suitable combination thereof. Examples of audio compositing include mixing multiple audio tracks into a single audio track. Examples of video effects include blurring, sharpening, color balancing, posterizing, lightening, darkening, sepia toning, or any suitable combination thereof. Examples of video compositing include transitions, fades, dissolves, wipes, luma keying, chroma keying, or any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
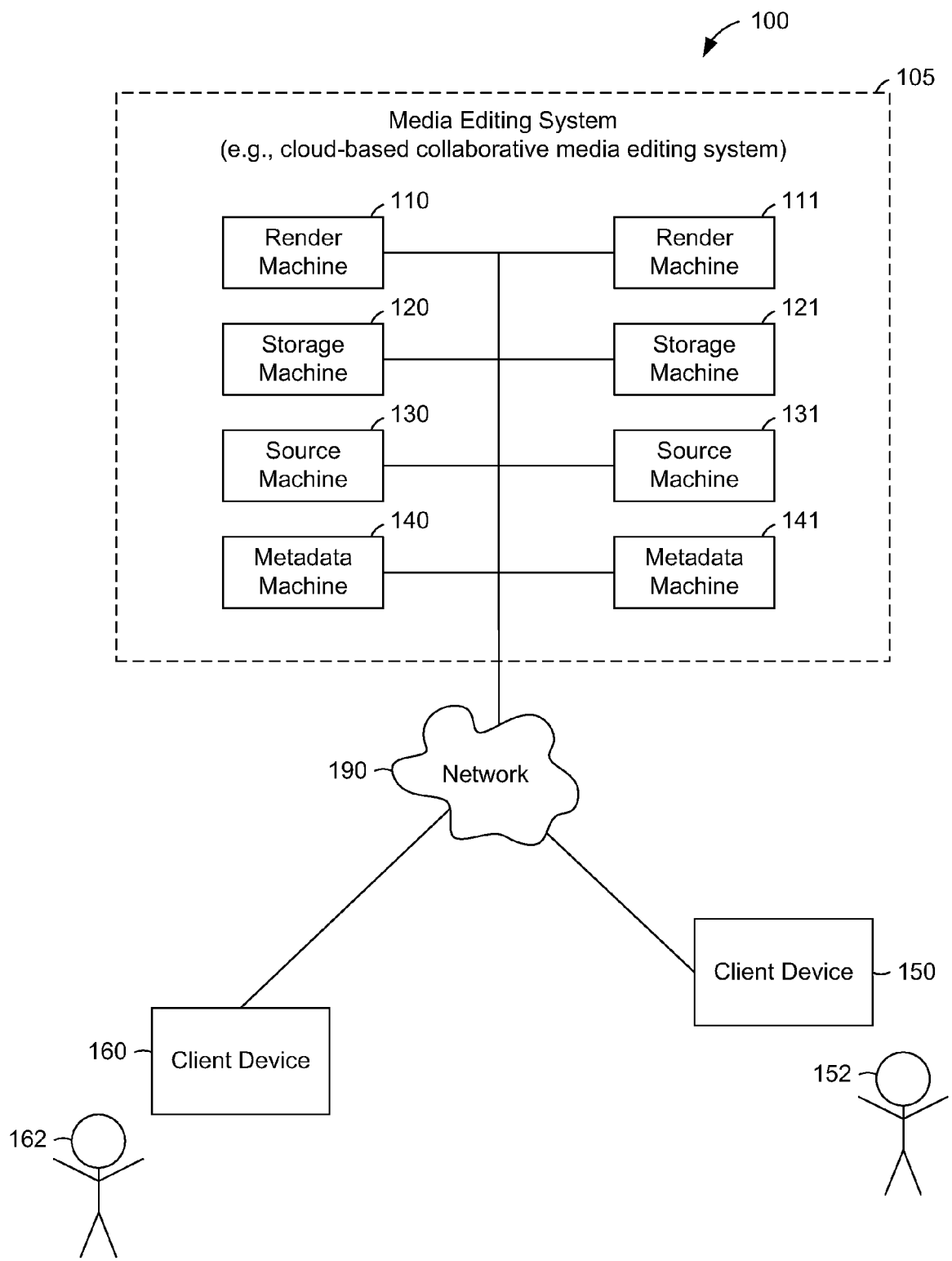
FIG. 1 is a network diagram illustrating a network environment suitable for a collaborative media editing system, according to some example embodiments.

Example methods and systems are directed to all or part of a media system that facilitates local or remote rendering. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A media editing system may include one or more machines and may implement one or more of the methodologies discussed herein to support cloud-based collaborative editing of media (e.g., media data or media content) by one or more client devices of the media editing system. Accordingly, multiple machines of the media editing system may be configured as nodes of a network (e.g., a cloud-like or fabric-like network), and one or more of the machines may be configured to communicate with (e.g., provide media editing services to) one or more of the client devices. As used herein, "media," "media data," and "media content" refer to one or more tracks of audio data, visual data, or both, arranged as a presentation (e.g., a presentation to be presented at a single point in time, such as an image, or a presentation to be presented over a period of time, such as a song or a movie). A piece of media (e.g., piece of media content) may include one or more media frames (e.g., an audio sample, an audio frame, a video field, or a video frame). Moreover, media frames may be arranged for sequential presentation (e.g., according to a timecode that corresponds to each media frame).

A machine in the media editing system may be configured as a render machine. Examples of other machines that may be included in the media editing system are a storage machine configured to store one or more edits to media (e.g., one or more sets of modifications to one or more pieces of media), a source machine configured to store media (e.g., one or more pieces of media), and a metadata machine configured to store metadata that corresponds to (e.g., describes) media (e.g., one or more pieces of media). In some example embodiments, a device (e.g., a computer, laptop, tablet, notebook, or smart phone) may be configured as a client device of the media editing system (e.g., for one or more particular functions of the media editing system). According to certain example embodiments, such a device may be configured as a client device with respect to a particular function (e.g., rendering a media frame) of the media editing system, and the device may be configured as part of the media editing system (e.g., a render machine or a source machine) with respect to another particular function (e.g., providing access to media stored at the device) of the media editing system.

The render machine may receive a render request from a client device, where the render request may specify that a media frame be generated based on another media frame that is stored by the media editing system (e.g., by another machine in the media editing system). The render machine may determine whether the render request is to be fulfilled by the client device or by the media editing system (e.g., by the render machine). Based on this determination, the render machine may initiate generation of the media frame requested by the render request. Where the render request is to be fulfilled by the media editing system, the render machine may communicate the generated media frame to the client device in response to the received render request. The generating of the media frame (e.g., by the render machine) may include applying one or more effects, compositing multiple media frames, or any suitable combination thereof. As used herein, application of an "effect" or application of a "media effect" to a piece of media refers to modifying (e.g., altering) the piece of media (e.g., a media frame) to create a perceptually distinct version of the piece of media (e.g., another media frame). As used herein, "compositing" refers to combining multiple pieces of media (e.g., multiple media frames) into a single piece of media (e.g., a single media frame). In some example embodiments, the render machine may determine a level of compression for the generated media frame and initiate such compression of the media frame. This determination of compression level may be based on network latency between the render machine and the client device, network speed (e.g., data rate, such as may be measured in bits per second) between the render machine and the client device, or both. Hence, according to various example embodiments, network performance may influence the compression level of the rendered media frame (e.g., high compression for poor network performance, or low compression for high network performance).

In some example embodiments, the render machine performs generation of the media frame. Moreover, the render machine may generate two versions of the media frame. For example, one version may be generated at maximum possible quality and stored on the render machine, while another version may be generated and then compressed (e.g., according to a determined compression level) and transmitted (e.g., to a client device). This may have the effect of enabling a client device to efficiently receive a usable version of the media frame (e.g., as proxy footage), while the media editing system maintains a maximum quality version of the media frame (e.g., for future use in generating one or more further media frames).

In some example embodiments, the determination of whether the render request is to be fulfilled by the client device or by the media editing system is based on network latency, network speed, or both. Hence, according to various example embodiments, network performance may influence where (e.g., by which machine or device) the media frame is to be rendered (e.g., locally by the client device if network performance is poor, or remotely by the render machine if network performance is high). In some example embodiments, the determination of whether the render request is to be fulfilled by the client device or by the media editing system is based on a position that the generated media frame will occupy in the media being edited. For example, the client device may present a graphical user interface (e.g., of media editor software) with a timeline indicating one or more positions of media frames within the media being edited (e.g., with the media frames being arranged according to their respective timecode values). In such an example, a cursor may be used (e.g., by a user of the client device) to select, edit, or play (e.g., scrub) a portion of the media, and the rendering of a media frame within or near this portion (e.g., within a few seconds of this portion) may be determined to be fulfilled by the client device (e.g., as a local renderer that may provide better scrubbing, editing, or playback performance compared to a remote renderer). Likewise, the rendering of a media frame that is distant from such a portion of the media (e.g., beyond a few minutes of this portion) may be determined to be filled by the media editing system (e.g., as a remote renderer that may provide a higher quality media frame compared to a local renderer).

In certain example embodiments, a device (e.g., configured as a client device of the media editing system) is configured to analyze edits (e.g., stored by a storage machine) for potential conflicts between the edits. According to various example embodiments, the device may be so configured by software executing on the device, and such software may be supplied by one or more machines of the media editing system (e.g., a render machine, the source machine, a storage machine, or a metadata machine). A storage machine within the media editing system may store one or more media projects (e.g., generated or authored by a user of the media editing system), and a media project may include or specify a set of edits (e.g., modifications, such as effects or compositions) to one or more media frames. A source machine within the media editing system may store the one or more media frames (e.g., for use by the user). The device may access multiple media projects (e.g., a first media project and a second media project), determine whether the set of edits in a particular media project is obtainable from the set of edits in another media project, and communicate a notification regarding compatibility of the media projects (e.g., a message indicating that the media projects are in conflict with each other, or a message indicating that the media projects are compatible with each other). This may have the effect of facilitating management of media projects and their edits, which may support collaborative editing of the same or similar pieces of media by multiple users of the media editing system (e.g., media editors who use the media editing system).

In various example embodiments, the device is configured to function as a source machine within (e.g., temporarily included in) a media editing system. According to various example embodiments, the device may be so configured by software executing on the device, and such software may be supplied by one or more machines of the media editing system (e.g., a render machine, the source machine, a storage machine, or a metadata machine). The device may store one or more pieces of media (e.g., media content). For example, the device may have captured or generated (e.g., using an internal or external camera and an internal or external microphone) a movie that includes a video track and an audio track (e.g., a stereo audio track). To make this piece of media available to the media editing system, other devices networked to the device, or any suitable combination thereof, the device may be configured to provide an availability notification to one or more other devices (e.g., configured as client devices of the media editing system) and communicate the piece of media to a source machine of the media editing system. In some example embodiments, communication of a piece of media to the source machine occurs slowly (e.g., at a low data rate compared to real time playback of a piece of media). While the communication of the piece of media to the source machine is in progress, the device may be configured (e.g., temporarily) as an additional source machine with respect to the media editing system. In certain example embodiments, the device remains configured as a source machine even after communication of the piece of media has completed. In response to the provided availability notification, the device may receive a request from another device (e.g., configured as a client of the media editing system), where the request is for access to the piece of media. In response to the received request, the device may provide access to the piece of media to the requesting device. Accordingly, media stored by a client device of the media editing system may be available and accessible to other client devices of the media editing system, regardless whether the piece of media has been uploaded to the media editing system (e.g., uploaded to a source machine in the media editing system). This may have the effect of dynamically extending or expanding, currently or temporarily, the cloud-like or fabric-like network of nodes (e.g., machines and devices) in the media editing system.

FIG. 1 is a network diagram illustrating a network environment 100 suitable for a collaborative media editing system, according to some example embodiments. The network environment 100 includes render machines 110 and 111, storage machines 120 and 121, source machines 130 and 131, metadata machines 140 and 141, and client devices 150 and 160, all communicatively coupled to each other via a network 190. The render machines 110 and 111, storage machines 120 and 121, source machines 130 and 131, and metadata machines 140 and 141 may form all or part of a media editing system 105, which may be a cloud-based collaborative media editing system. According to various example embodiments, any one or more of the render machines 110 and 111, storage machines 120 and 121, source machines 130 and 131, and metadata machines 140 and 141 may be implemented in a computer system, in whole or in part, as described below with respect to FIG. 16.

Each of the render machines 110 and 111, as noted above, may be configured to receive a render request from a client device, determine whether that client device is to fulfill the render request, and initiate the fulfillment of that render request (e.g., by initiating generation of a media frame requested to be generated based on another media frame). Further details of the render machine 110 are discussed below with respect to FIG. 2. The render machine 111 may be configured similarly to the render machine 110.

Each of the storage machines 120 and 121, as noted above, may be configured to store one or more edits to one or more pieces of media (e.g., media content). Accordingly, one or both of the storage machines 120 and 121 may create and maintain one or more databases, externally or internally, to store such edits. As used herein, an "edit" to a piece of media is a description of a modification to the piece of media (e.g., an instruction or a command to modify the piece of media). An edit may specify that one or more effects be applied to the piece of media, that the piece of media be composited with another piece of media, or any suitable combination thereof. A storage machine (e.g., storage machine 120) may store one or more media projects (e.g., a list or arrangement of edits), where a particular media project may specify a set of one or more edits to one or more pieces of media. Further details of the storage machine 120 are discussed below with respect to FIG. 3. The storage machine 121 may be configured similarly to the storage machine 120.

Each of the source machines 130 and 131, as noted above, may be configured to store one or more pieces of media (e.g., media content). For example, the source machine 130 may store a video track (e.g., a sequence of video frames), while the storage machine 120 may store a media project that specifies (e.g., includes) a set of edits to that video track (e.g., a group of edits to be applied to the video frames in the video track). One or both of the source machines 130 and 131 may create and maintain one or more databases, externally or internally, to store such media. Further details of the source machine 130 are discussed below with respect to FIG. 4. The source machine 131 may be configured similarly to the source machine 130.

Each of the metadata machines 140 and 141, as noted above, may be configured to store metadata that corresponds to (e.g., describes) one or more pieces of media (e.g., stored by one or more source machines). For example, the metadata machine 140 may store a set of one or more descriptors for the video track stored by the source machine 130. As examples, the one or more descriptors may indicate or reference a date that the video track was created, a date that the video track was uploaded to the media editing system 105, an author of the video track, a duration of the video track, a frame size (e.g., image resolution) of the video track, a frame rate (e.g., in frames per second) of the video track, a compression scheme used to compress the video track, or any suitable combination thereof. One or both of the metadata machines 140 and 141 may create and maintain one or more databases, externally or internally, to store such metadata (e.g., descriptors). Further details of the metadata machine 140 are discussed below with respect to FIG. 4. The metadata machine 141 may be configured similarly to the metadata machine 140.

Each of the client devices 150 and 160, as noted above, may be devices that are configured as clients of the media editing system 105. As examples, one or both of the client devices 150 and 160 may be a computer (e.g., a laptop computer, a tablet computer, a notebook computer, or a deskside computer), a phone (e.g., a smartphone), a game console, a media workstation, an Internet appliance, or any suitable combination thereof. One or both of the client devices 150 and 160 may download (e.g., from a machine in the media editing system 105) and execute software (e.g., one or more modules of an application, a plug-in for an application, an applet, or a mobile app), where execution of the software configures a device as a client of the media editing system 105. According to some example embodiments, one or both of the client devices 150 and 160 may create and maintain one or more databases, externally or internally, to store media (e.g., locally captured or generated media). Further details of the client device 150 are discussed below with respect to FIG. 5. The client device 160 may be configured similarly to the client device 150.

Also shown in FIG. 1 are users 152 and 162. One or both of the users 152 and 162 may be a human user (e.g., a human being), a machine user (e.g., a software program configured to interact with the client device 150), or any suitable combination thereof (e.g., a human assisted by a machine or a machine supervised by a human). The user 152 is not part of the network environment 100, but is associated with the client device 150 and may be a user of the device 150. For example, the client device 150 may be a tablet computer or a smart phone belonging to the user 152. Similarly, the user 162 is not part of the network environment 100, but is associated with the device 160 and may be a user of the device 160. As an example, the device 160 may be a tablet computer or a smart phone belonging to the user 162.

Any of the machines or devices shown in FIG. 1 may be implemented in a general-purpose computer modified (e.g., configured or programmed) by software (e.g., an application, a plug-in for an application, an applet, or a mobile app) to be a special-purpose computer to perform the functions described herein for that machine. For example, a computer system able to implement any one or more of the methodologies described herein is discussed below with respect to FIG. 16. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines or devices illustrated in FIG. 1 may be combined into a single machine, and the functions described herein for any single machine or device may be subdivided among multiple machines or devices.

The network 190 may be any network that enables communication between machines (e.g., render machine 110 and client device 150). Accordingly, the network 190 may be a wired network, a wireless network (e.g., a mobile network), or any suitable combination thereof. The network 190 may include one or more portions that constitute a private network, a public network (e.g., the Internet), or any suitable combination thereof.

Figure 2:
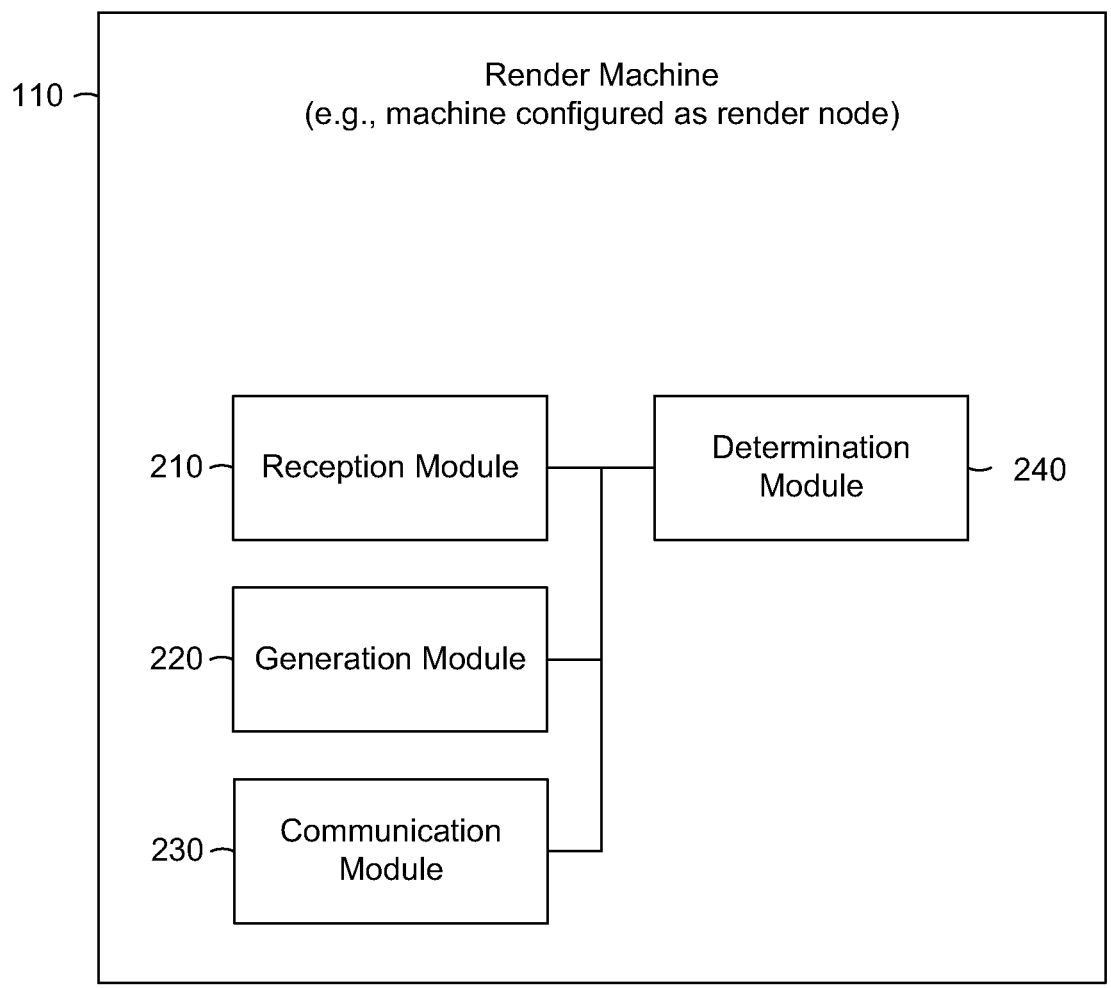
FIG. 2 is a block diagram illustrating components of a render machine in a collaborative media editing system, according to some example embodiments.

FIG. 2 is a block diagram illustrating components of the render machine 110 in the media editing system 105, according to some example embodiments. The render machine 110 includes a reception module 210, a generation module 220, a communication module 230, and a determination module 240, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The reception module 210 of the render machine 110 is configured to receive a render request. The render request may be received from a client device (e.g., client device 150). The render request may specify that a media frame (e.g., a first media frame) be generated based on (e.g., by modifying) another media frame (e.g., second media frame) that may be stored by a source machine (e.g., source machine 130). The reception module 210 may receive the render request in response to media editor software (e.g., Adobe Premiere®) being executed by the client device from which the render request is received (e.g., where the media editor software configures the client device to initiate generation of the render request). In some example embodiments, the media editor software includes an interface (e.g., a user interface) that is operable by a user of the client device to specify the generation of the media frame based on one or more media frames. For example, the interface may be a non-linear editor interface.

According to various example embodiments, the render request received by the reception module 210 of the render machine 110 may specify that a first media frame be generated based on a second media frame. For example, the render request may specify that the second media frame be composited with a third media frame to generate the first media frame. As another example, the render request may specify that the second media frame be modified (e.g., by application of one or more media effects) to generate the first media frame.

The generation module 220 of the render machine 110 is configured to initiate generation of a media frame (e.g., a first media frame). The generation of the media frame may be initiated in response to the render request received by the reception module 210 of the render machine. As initiated by the generation module 220, the generation of the media frame may be based on one or more media frames (e.g., a second media frame, a third media frame, or both).

Moreover, the initiating of the generation of the media frame may be based on a determination of whether a client device (e.g., client device 150) is selected to generate the media frame. Such a determination may be performed by the client device, the render machine 110 (e.g., the determination module 240 of the render machine 110), or any suitable combination thereof. For example, the generation module 220 may initiate the generation of the media frame based on a determination that the client device (e.g., and not the render machine 110) is selected to generate the media frame. As another example, the generation module 220 may initiate the generation of the media frame based on a determination that the render machine 110 (e.g., and not the client device) is selected to generate the first media frame. Accordingly, as initiated by the generation module 220, the generation of the media frame may be performed by the render machine 110 (e.g., by the generation module 220 of the render machine 110). In some example embodiments, as initiated by the generation module 220, the generation of the media frame is performed by the client device (e.g., client device 150) from which a render request was received by the reception module 210 (e.g., the render request specifying that the media frame be generated).

According to various example embodiments, the generation module 220 of the render machine 110 is configured to generate a first media frame based on a second media frame (e.g., as specified by a render request). The generation of the first media frame may be initiated by the generation module 220, as described above. The generation module 220, in generating the first media frame, may access the second media frame from a source machine (e.g., source machine 130). For example, the second media frame may be absent from a client device (e.g., client device 150) that communicated a render request specifying that the first media frame be generated based on the second media frame, and the generation module 220 may access the second media frame from the source machine that stores the second media frame (e.g., in response to the second media frame being absent from the client device).

In some example embodiments, the first media frame and the second media frame are video frames (e.g., progressive or interlaced video images), and the generation module 220 is configured to modify one or more pixels within the second media frame to generate one or more pixels (e.g., monochromatic or multi-component picture elements) within the first media frame, in the generation of the first media frame. In certain example embodiments, the first media frame and the second media frame are audio frames (e.g., compressed or uncompressed sets of one or more audio samples), and the generation module 220 is configured to modify audio data (e.g., audio samples) within the second media frame to generate audio data within the first media frame.

In example embodiments where the render request received by the reception module 210 of the render machine 110 specifies that the second media frame be composited with a third media frame to generate the first media frame, the generation module 220 of the render machine 110 may access the third media frame from a source machine (e.g., source machine 130) and composite the second media frame with the third media frame, in generating the first media frame. In the example embodiments where the render request specifies that the second media frame be modified to generate the first media frame, the generation module 220 may apply one or more effects to the second media frame, in generating the first media frame.

Furthermore, the generation module 220 of the render machine 110 may be configured to initiate compression of a media frame (e.g., a first media frame), where the media frame may be generated by the generation module 220 (e.g., based on the second media frame, as specified by a render request). As initiated by the generation module 220, the compression of the media frame may be to a level of compression (e.g., a degree or extent of lossy or lossless media compression) that is determined by the determination module 240 of the render machine 110.

The communication module 230 of the render machine 110 is configured to communicate one or more media frames (e.g., a media frame generated by the generation module 220). The communicating of a generated media frame (e.g., a first media frame) may be in response to a render request received by the reception module 210 of the render machine 110. Moreover, the communication module 230 may provide software (e.g., client software in the form of an application, a plug-in for an application, an applet, or a mobile app) to one or more devices (e.g., client device 150). When executed by a device (e.g., a processor of a device), the software may configure the device as a client device of the media editing system 105. In some example embodiments, the software configures the device to communicate one or more render requests to the media editing system 105 (e.g., the reception module 210 of the render machine 110), receive one or more media frames (e.g., generated by the generation module 220 of the render machine 110) from the media editing system 105 (e.g., the communication module 230 of the render machine 110), or any suitable combination thereof. In certain example embodiments, the software configures the device to generate the one or more render requests (e.g., a render request specifying that a first media frame be generated based on a second media frame).

In some example embodiments, the communication module 230 of the render machine 110 is configured to communicate a notification regarding compatibility of a set of edits (e.g., specified by a media project) with another set of edits (e.g., specified by another media project). For example, the communication module 230 may communicate a message that the two sets of edits are incompatible (e.g., in conflict) with each other. As another example, the communication module 230 may communicate a message that the two sets of edits are compatible (e.g., not in conflict) with each other.

The determination module 240 of the render machine 110 is configured to determine whether the client device (e.g., client device 150) that communicated the render request received by the reception module 210 is selected to generate a first media frame (e.g., based on a second media frame, as specified by the render request). This may have the effect of selecting between client-side rendering (e.g., "local" rendering by a client device) and cloud-based rendering (e.g., "remote" or "server-side" rendering by one of the machines in the media editing system 105). In some example embodiments this determination is made while the render machine 110 is available to generate the first media frame (e.g., when both "local" and "remote" rendering are possible, according to the capabilities of the client device and the media editing system 105). Moreover, this may have the effect of determining which machine or device is selected to perform the rendering of the first media frame (e.g., from among multiple render machines available within the media editing system 105). For example, the determination module 240 may determine that the client device 150 is selected to generate the first media frame and that the render machine 110 is available to perform the generation of the first media frame. In some example embodiments, the client device 150 is selected, and the render machine 110 is unavailable to generate the first media frame (e.g., while the render machine 111 is available). As another example, the determination module 240 may determine that the client device 150 is available but not selected (e.g., unselected or non-selected) to generate the first media frame and that the render machine 110 is available to perform the generation of the first media frame. In some example embodiments, the client device 150 is available but not selected, and the render machine 110 is unavailable to generate the first media frame (e.g., while the render machine 111 is available).

In some example embodiments, the determination module 240 of the render machine 110 is configured to determine a level of compression for a media frame (e.g., a first media frame) generated or being generated (e.g., based on a second media frame) by the render machine 110 (e.g., via the generation module 220 of the render machine 110). The determining of the level of compression may be based on network latency (e.g., an indicator of latency present in the network 190) between the render machine 110 and the client device (e.g., client device 150) that communicated the render request received by the reception module 210, network speed (e.g., an indicator of a data rate observed, measured, predicted, expected, or promised in the network 190), or any suitable combination thereof. According to various example embodiments, the determining of the level of compression may be based on a period of time (e.g., calculated, projected, or estimated) for compression of the media frame. For example, the determining of the level of compression may be based on a comparison of the first period of time estimated for compression of the media frame to a second period of time estimated for transmission of the media frame (e.g., to the client device 150).

In certain example embodiments, the determination module 240 of the render machine 110 determines whether the client device (e.g., client device 150) that communicated the render request is selected to generate a media frame. This determination may be based on a position that the generated media frame will occupy in a particular piece of media (e.g., media open for editing at the client device). For example, the client device 150 may present a graphical user interface (e.g., generated according to media editor software executing on the client device 150), where the graphical user interface includes a timeline that indicates an arrangement of media frames within the media (e.g., arranged according to timecode values). In such an example, a cursor may be presented (e.g., by the client device 150 to a user) for selecting, editing, or playing (e.g., scrubbing) the media or a portion thereof. As examples, the cursor may take the form of a vertical line (e.g., intersecting a horizontal timeline). The cursor may accordingly indicate a "current" position within a timeline, a "selected" media frame within the media, or any suitable combination thereof. The determination module 240 may determine that a media frame to be rendered at or near this position is to be rendered by the client device (e.g., as a local renderer that may provide better performance compared to a remote renderer). Likewise, the determination module 240 may determine that a media frame distant from such a position in the timeline be rendered by the media editing system 105 (e.g., the generation module 220 of the render machine 110, as a remote renderer that may provide a higher quality media frame compared to a local renderer).

According to various example embodiments, the determination module 240 of the render machine 110 may perform this determination based on media editor software (e.g., Adobe Premiere®) being executed by the client device (e.g., client device 150) that communicated the render request. The media editor software may configure the client device to generate (e.g., create or modify) media, present (e.g., preview, play, or scrub) media, or both. The media editor software may be executed to generate media content based on one or more media frames (e.g., based on a second media frame to be used as a basis from which to generate a first media frame). For example, the client device 150 may execute or be executing the media editor software (e.g., in conjunction with software in the form of an application, a plug-in for an application, an applet, or a mobile app that configures the client device 150 to communicate with the media editing system 105), and this execution of the media editor software may provide the determination module 220 with information (e.g., latency and speed of the network 190, or processor, memory, and storage capabilities of the client device 150) that forms a basis (e.g., among other bases) for the determination of whether the client device is selected to generate the media frame. The media editor software may be executed by the client device to present media content based on one or more media frames. In some example embodiments, media player software (e.g., with or without media editing features) may be used instead of media editor software. As an example, the client device 150 may execute or be executing media editor or player software (e.g., in conjunction with software in the form of an application, a plug-in for an application, an applet, or a mobile app that configures the client device 150 to communicate with the media editing system 105), and this execution of the software may provide the determination module 220 with information (e.g., latency and speed of the network 190, or processor, memory, and storage capabilities of the client device 150) that forms a basis (e.g., among other bases) for the determination of whether the client device is selected to generate the media frame.

According to various example embodiments, the determination module 240 of the render machine 110 may be internal or external to the render machine 110. For example, the determination module 240 may be included in another render machine 111 that is communicatively coupled to the render machine 110.

Figure 3:
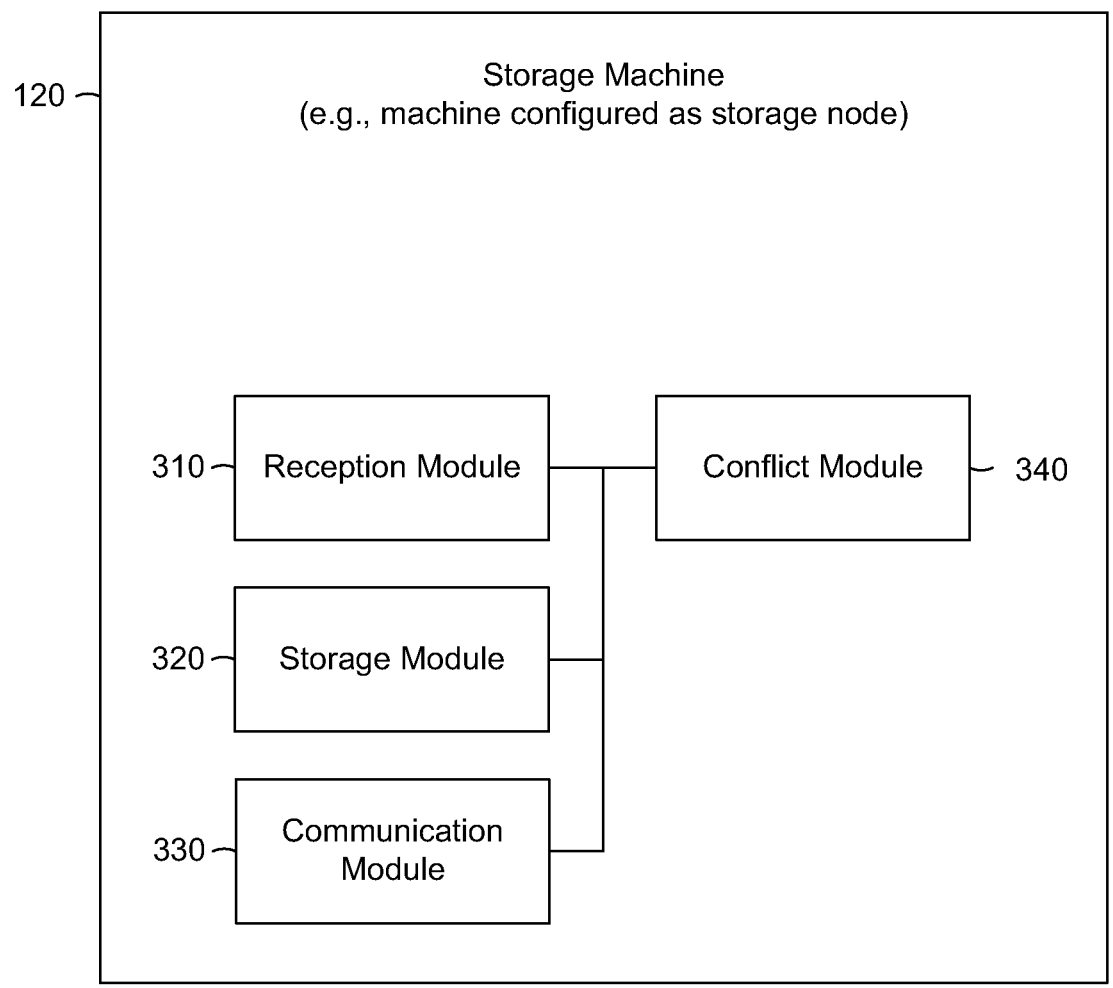
FIG. 3 is a block diagram illustrating components of a storage machine in a collaborative media editing system, according to some example embodiments.

FIG. 3 is a block diagram illustrating components of the storage machine 120 in the media editing system 105, according to some example embodiments. The storage machine 120 includes a reception module 310, a storage module 320, a communication module 330, and a conflict module 340, all configured to communicate with each other (e.g., via a bus, shared memory, or a switch).

The reception module 310 of the storage machine 120 is configured to receive one or more edits (e.g., information describing one or more edits) to media (e.g., a piece of media content stored by the source machine 130). A set of one or more edits may be stored (e.g., saved) as a media project (e.g., a published or unpublished media project), where the media project specifies (e.g., indicates, references, or describes) the set of one or more edits. Moreover, the reception module 310 may be configured to receive a request to check for conflicts between or among multiple media projects. Furthermore, the reception module 310 may receive a request to publish a media project, where publication of a media project may include marking the media project as being published, notifying one or more users (e.g., user 152 and user 162) that the media project is published, or any suitable combination thereof.

As noted above, a media frame may be a video frame (e.g., an image composed of pixels. Accordingly, a first media project may specify a first set of edits that includes a modification to one or more pixels of the video frame, and a second media project may specify a second set of edits that includes a different modification to the one or more pixels of the video frame. For example, the first media project may specify that pixels in a portion of the video frame be darkened, while the second media project may specify that the pixels in the same portion of the same video frame be deleted (e.g., cropped).

As noted above, a media frame may be an audio frame (e.g., a 1 second audio clip composed of audio samples). Accordingly, a first media project may specify a first set of edits that includes a modification to audio data (e.g., audio samples) included within the audio frame, and a second media project may specify a second set of edits that includes a different modification to the audio data of the audio frame. For example, the first media project may specify that audio data in an audio frame be adjusted for loudness (e.g., within a particular dynamic range), while the second media project may specify that the audio data be subject to hiss removal (e.g., reduction of high frequencies above a particular threshold frequency).

The storage module 320 of the storage machine 120 stores one or more media projects, one or more sets of edits, or any suitable combination thereof (e.g., within a database that is internal or external to the storage machine 120). According to various example embodiments, the storage module 320 stores a media project with information that marks the media project as being published or unpublished. Moreover, the storage module 320 may store a media project with information that indicates whether the media project (e.g., a first media project) is incompatible (e.g., in conflict) with another media project (e.g., a second media project) or compatible (e.g., not in conflict) with the other media project.

In some example embodiments, the storage module 320 of the storage machine 120 is configured to access one or more media projects (e.g., a first media project and a second media project). For example, the storage module 320 may access a first media project that specifies a first set of edits to a media frame, as well as a second media project that specifies a second set of edits to the same media frame.

The communication module 330 of the storage machine 120 is configured to communicate a notification regarding compatibility (e.g., compatibility or incompatibility) between or among multiple sets of edits (e.g., multiple media projects). For example, the communication module 330 may communicate a message (e.g., to the client device 150 or the client device 160) that a first media project and a second media project are incompatible (e.g., in conflict) with each other. As another example, the communication module 330 may communicate a request that a user (e.g., user 152 or user 162) resolve a conflict between the first media project and the second media project. Such a request may ask that the user choose from a set of available choices, where the available choices may include a selection of the first media project at the exclusion of the second media project, a selection of the second media project at the exclusion of the first media project, or both selections. As a further example, the communication module 330 may communicate a message that a first media project and a second media project are compatible (e.g., not in conflict) with each other. Such a message may indicate that the first media project and the second media project are being, or have been, automatically merged together into a single media project (e.g., a combined set of edits).

In some example embodiments, the communication module 330 of the storage machine 120 is configured to provide software (e.g., client software in the form of an application, a plug-in for an application, an applet, or a mobile app) to one or more devices (e.g., client device 150). When executed by a device (e.g., a processor of a device), the software may configure the device as a client device of the media editing system 105. In some example embodiments, the software configures the device to access a media frame stored by a source machine (e.g., source machine 130). In certain example embodiments, the software configures the device to specify (e.g., by sending one or more requests to the reception module 310 of the storage machine 120) one or more sets of edits (e.g., from one or more media projects), and the access of one or more media projects by the storage module 230 of the storage machine 120 may be in response to the specification of the one or more sets of edits by the device. In certain example embodiments, the software configures the device to generate and send one or more such requests that specify one or more sets of edits (e.g., one or more media projects). For example, the software may configure the device 150 to send a request that a compatibility check (e.g., a conflict check) be performed for a first media project and a second media project. Accordingly, the device 150 may generate and send this request to one or more machines of the media editing system (e.g., storage machine 120). The reception module 310 of the storage machine 120 may receive this request, and the storage module 320 of the storage machine 120 may access the first and second media projects in response to this request.

The conflict module 340 of the storage machine 120 is configured to determine whether a set of edits (e.g., from a media project) is obtainable from another set of edits (e.g., from another media project). For purposes of the conflict module 340, a first set of edits is "obtainable" from a second set of edits if there exists at least one combination of available edits that, when applied to the second set of edits, results in the first set of edits. In this context, "available edits" may refer to the set of all edits supported by the media editing system, one or more client devices (e.g., client device 150), or any suitable combination thereof. In some example embodiments, the available edits include "undo" operations (e.g., reversing or ignoring an edit). The determination of whether a set of edits is obtainable from another set of edits may be performed in response to a request (e.g., received by the reception module 310 of the storage machine 120), where the request may be for performance of a conflict check between or among the sets of edits, for publication of one or more sets of edits (e.g., for publication of one or more media projects), or any suitable combination thereof.

Accordingly, the conflict module 340 may determine that a second set of edits (e.g., specified by a second media project) is unobtainable from a first set of edits (e.g., specified by a first media project). In particular, the conflict module 340 may determine that no combination of available edits results in the second set of edits when applied to the first set of edits. Such a determination may form the basis of the conflict module 340 determining that the first and second set of edits are incompatible (e.g., in conflict) with each other.

Similarly, the conflict module 340 may determine that the second set of edits is obtainable from a first set of edits. For example, the conflict module 340 may determine a combination of available edits that results in the second set of edits when applied to the first set of edits. In some example embodiments, the conflict module 340 determines the combination of available edits as a third set of edits that may be applied to the first set of edits. Moreover, the conflict module 340 may initiate application of the combination of available edits to the first set of edits. As initiated by the conflict module 340, the application of the combination to the first set of edits may be performed by the conflict module 340, the generation module 220 of the render machine 110, or any suitable combination thereof). In certain example embodiments, the conflict module 340 determines that the combination exists (e.g., the at least one combination exists) but does not determine the actual edits that may be applied to the media frame.

Figure 4:
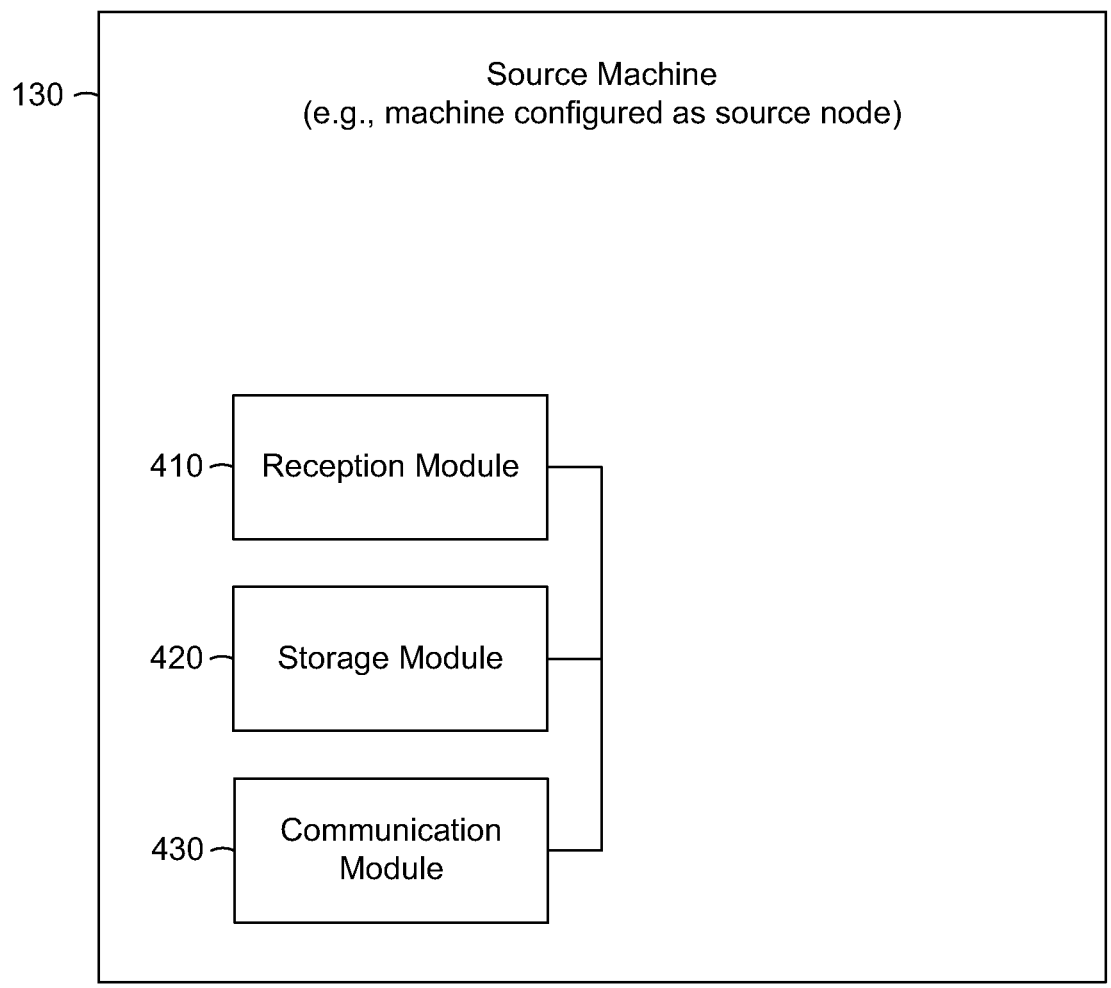
FIG. 4 is a block diagram illustrating components of a source machine in a collaborative media editing system, according to some example embodiments

FIG. 4 is a block diagram illustrating components of the source machine 130 in the media editing system 105, according to some example embodiments. The source machine 130 includes a reception module 410, a storage module 420, and a communication module 430, all configured to communicate with each other (e.g., via a bus, shared memory, or a switch).

The reception module 410 of the source machine 130 is configured to receive media (e.g., media content). Media may be received for storage, access, editing, archival, or retrieval purposes. Moreover, the reception module 410 may receive a request for access to media (e.g., media content) or any one or more portions thereof stored by the source machine 130. For example, the reception module 410 receives a request for access to one or more media frames (e.g., a second media frame) stored internally or externally at the source machine 130.

The storage module 420 of the source machine 130 is configured to store media (e.g., in a database that is internal or external to the storage machine 130). For example, the storage module 130 may store a media frame (e.g., along with other media frames from a piece of media) in one or more databases that are managed by (e.g., connected to) the source machine 130. The storage module 420 may be configured to access and provide the media stored by the source machine 130 (e.g., one or more media frames).

The communication module 430 of the source machine 130 is configured to communicate media, or one or more portions thereof, from the source machine 130 to one or more machines within the media editing system 105 (e.g., render machine 110) or to one or more clients thereof (e.g., client device 150). For example, the communication module 430 may communicate a media frame (e.g., a second media frame) to the client device 150 for use (e.g., editing) within media editor software being executed by the client device 150. As another example, the communication module 430 may communicate the media frame to the client device 160 for use within different media editor software (e.g., having different capabilities compared to the media editor software being executed by the client device 150) being executed by the client device 160. As a further example, the communication module 430 may communicate the media frame to the render machine 110 for use (e.g., generation of the first media frame based on the second media frame) by the generation module of the render machine 110.

Figure 5:
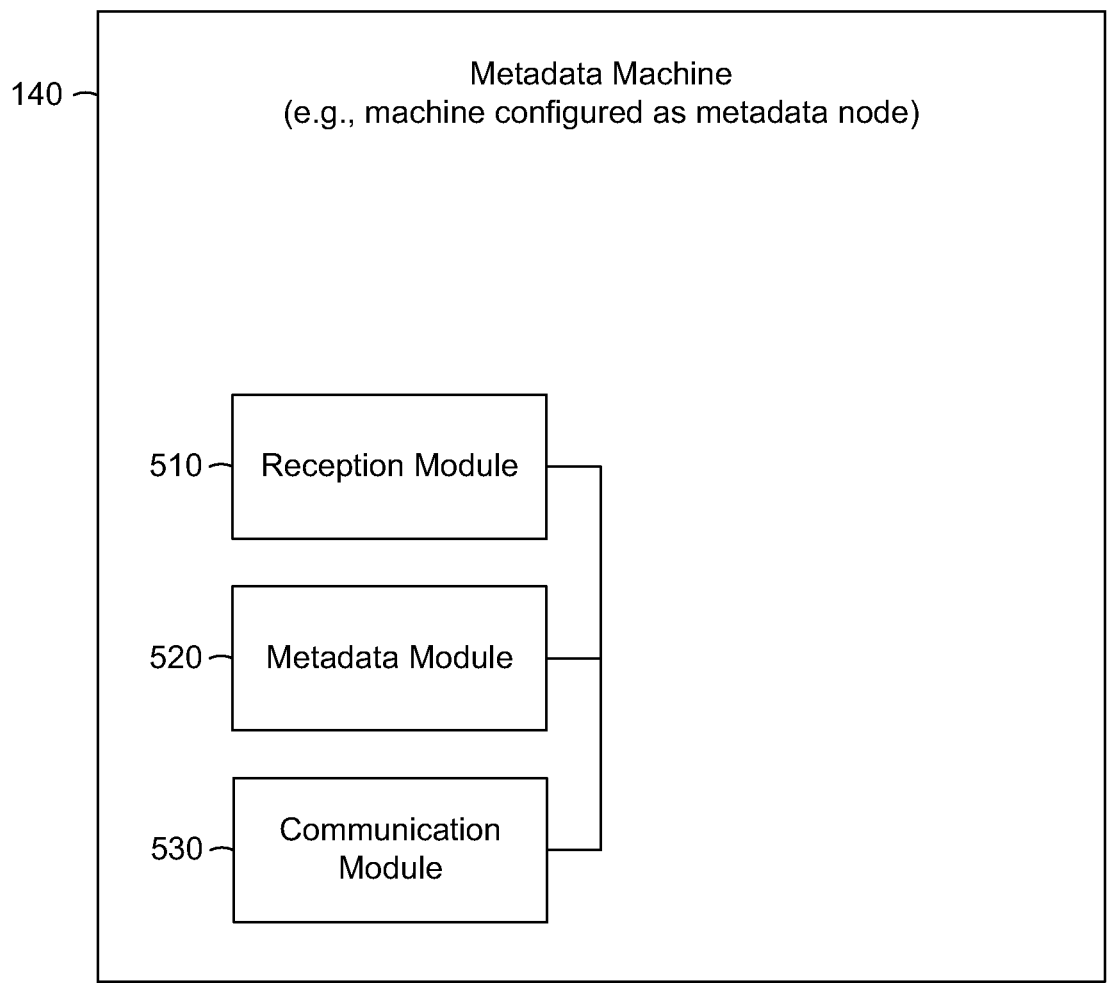
FIG. 5 is a block diagram illustrating components of a metadata machine in a collaborative media editing system, according to some example embodiments.

FIG. 5 is a block diagram illustrating components of the metadata machine 140 in the media editing system 105, according to some example embodiments. The metadata machine 140 includes a reception module 510, a metadata module 520, and a communication module 530, all configured to communicate with each other (e.g., via a bus, shared memory, or a switch).

The reception module 510 of the metadata machine 140 is configured to receive metadata (e.g., descriptors) of media stored by a source machine (e.g., source machine 130), metadata of one or more edits (e.g., a set of edits specified by a media project) stored by a storage machine (e.g., storage machine 120), or any suitable combination thereof.

The metadata module 520 of the metadata machine 140 is configured to store the metadata received by the reception module 510 of the metadata machine (e.g., in a database that is internal or external to the metadata machine 140). The metadata may be stored within one or more databases that are managed by (e.g., connected to) the metadata machine 140. For example, the metadata module 520 may store a set of one or more descriptors for the video track stored by the source machine 130. As noted above, the one or more descriptors may indicate or reference a date that the video track was created, a date that the video track was uploaded to the media editing system 105, an author of the video track, a duration of the video track, a frame size (e.g., image resolution) of the video track, a frame rate (e.g., in frames per second) of the video track, a compression scheme used to compress the video track, or any suitable combination thereof.

The communication module 530 of the metadata machine 140 is configured to communicate metadata, or one or more portions thereof, from the metadata machine 140 to one or more machines within the media editing system 105 (e.g., render machine 110) or to one or more clients thereof (e.g., client device 150).

Figure 6:
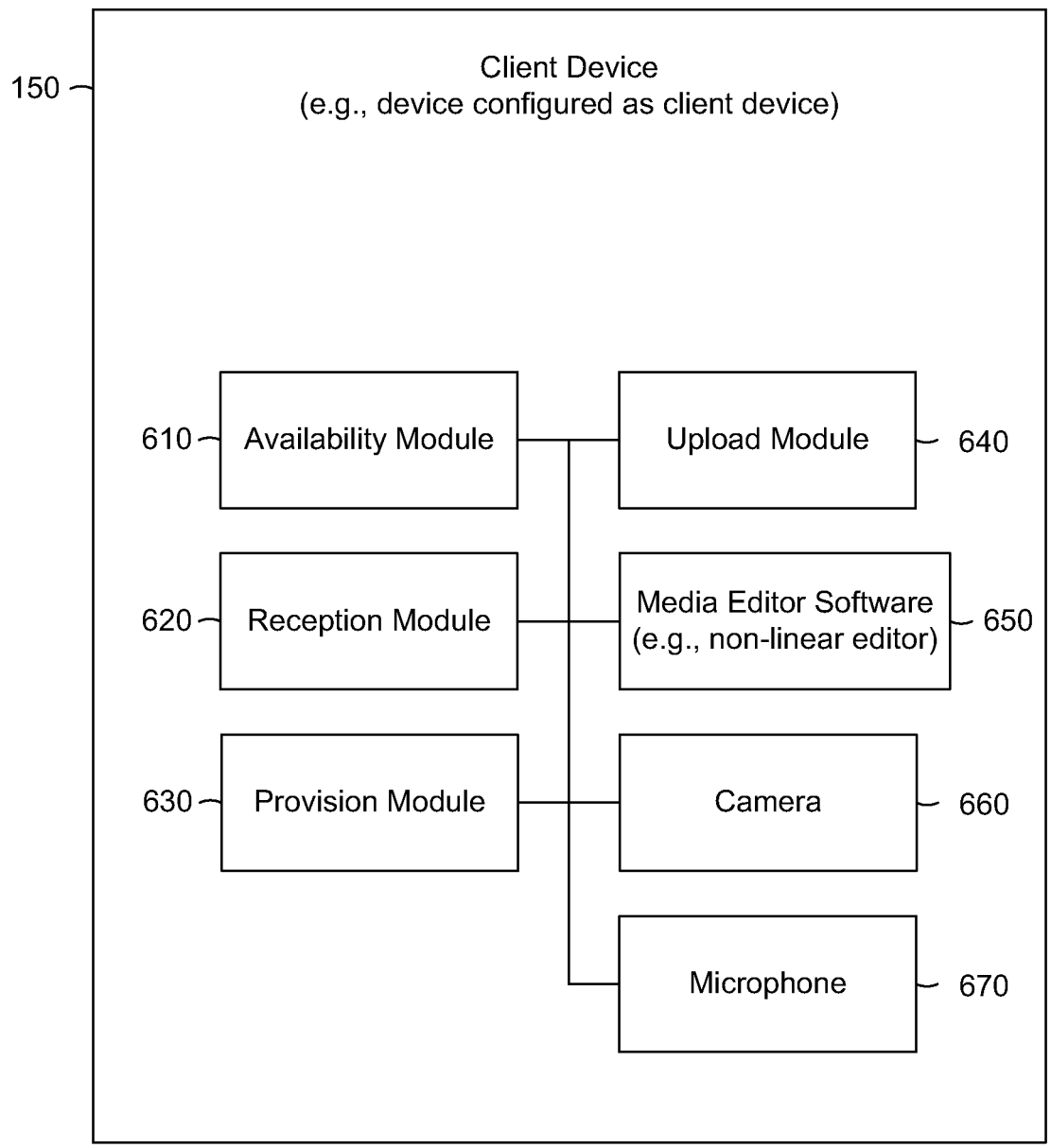
FIG. 6 is a block diagram illustrating components of a client device in a collaborative media editing system, according to some example embodiments.

FIG. 6 is a block diagram illustrating components of the client device 150 in the network environment 100, according to some example embodiments. The client device 150 includes an availability module 610, a reception module 620, a provision module 630, an upload module 640, media editor software 650, a camera 660, and a microphone 670, all configured to communicate with each other (e.g., via a bus, shared memory, or a switch).

The availability module 610 of the client device 150 is configured to provide an availability notification (e.g., a message, an alert, or an indication). The availability notification may indicate that media (e.g., one or more pieces of media content) stored by the client device 150 (e.g., in a database that is internal or external to the client device 150) is available for access. For example, the media stored by the client device 150 may be absent from another client device (e.g., client device 160) of the media editing system 105, and the availability notification may be provided to the other client device (e.g., as an announcement or advertisement that the media is available for access by the other client device). In some example embodiments, the media is captured (e.g., recently) by the client device 150 or components (e.g., internal or external peripherals or accessories, such as the camera 660 and the microphone 670) thereof. In certain example embodiments, the media is generated by the client device 150 (e.g., within a memory of the client device 150). Moreover, the availability module 610 may detect that the media is stored by the client device 150, and the providing of the availability notification may be in response to the detecting that the media is stored by the client device 150. The availability notification may be provided to the media editing system 105 (e.g., source machine 130), to one or more clients of the media editing system 105 (e.g., client device 160), or any suitable combination thereof.

The reception module 620 of the client device 150 is configured to receive a request (e.g., from the client device 160) to access the media stored by the client device 150. The request may be received from a client (e.g., client device 160) of the media editing system 105 (e.g., directly or indirectly from the client). Moreover, the request may be received in response to the availability notification provided by the availability module 610 of the client device 150. In some example embodiments, one or more machines of the media editing system 105 (e.g., source machine 130) functions as an intermediary to relay the request to the client device 150. In certain example embodiments, a machine in the media editing system 105 (e.g., render machine 110 or a source machine 130) sends a request to access the media, and the reception module 620 receives the request from the media editing system 105.

The provision module 630 of the client device 150 is configured to provide access to the media (e.g., to the device or machine from which a request for access was received by the reception module 620 of the client device 150). Access to the media may be provided by allowing the media, or one or more portions thereof, to be read (e.g., retrieved, play, or copied) from the client device 150. In some example embodiments, access to the media is provided by communicating the media or one or more portions thereof (e.g., to the device or machine from which the request for access was received).

In certain example embodiments, the provision module 630 of the client device 150 is configured to perform rendering of one or more media frames. For example, in response to a determination (e.g., by the determination module 240 of the render machine 110) that the client device 150 is selected to generate a first media frame based on a second media frame (e.g., stored by the client device 150 or stored by the source machine 130), the provision module 630 may generate the first media frame at the client device 150. Moreover, the provision module 630 may provide the generated first media frame to a client device (e.g., client device 160) that communicated a render request to the media editing system 105. In this sense, the client device 150 may be configured (e.g., by client software) as a render machine (e.g., temporarily or permanently) with respect to one or more other client devices (e.g., client device 160).

When the client device 150 is configured as a render machine, the provision module 630 of the client device 150 may determine a resolution for the first media frame, a compression level for the first media frame, or any suitable combination thereof. The various functions described above for the render machine 110 (e.g., generation module 220 and determination module 240) may be similarly implemented by the provision module 630 of the client device 150. Conversely, any one or more of the functions described herein for the provision module 640 may be likewise implemented by the render machine 110 (e.g., generation module 220, determination module 240, or any suitable combination thereof).

Accordingly, the provision module 630 may determine a resolution or compression level of the first media frame based on an indicator of latency in the network 190, based on indicator of a data rate in the network 190, or based on any suitable combination thereof. The provision module 630 may determine the resolution or compression level of the first media frame based on a position that the first media frame will occupy within a timeline (e.g., of a graphical user interface) presented by another client device (e.g., client device 160) that communicated a render request for generation of the first media frame. The render request may be communicated by the other client device (e.g., client device 160) based on (e.g., as a result of) media editor software (e.g., similar to the media editor software 650) executed or being executed by the other client device. According to various example embodiments, the media editor software of the other client device (e.g., client device 160) is executed or being executed to generate media (e.g., the first media frame), present media, or any suitable combination thereof. In this sense, when the client device 150 is configured as a render machine, the other client device may be configured (e.g., temporarily or currently) as a client of the client device 150.

The upload module 640 of the client device 150 is configured to communicate the media stored by the client device 150 to a source machine (e.g., source machine 130) of the media editing system 105. The upload module 640 communicates the media to the media editing system 105, and this communication may be independent of the access to the media provided by the provision module 630 of the client device 150. For example, the provision module 630 may provide the client device 160 with high-speed access to the media in response to a request for high-speed access, and the upload module 640 may communicate the media at a lower speed (e.g., "lazy" uploading) to the source machine 130 (e.g., via reception module 410 of the source machine 130)

for future use by the media editing system 105 (e.g., future provision of access to the media when the client device 150 is disconnected from the network 190). Accordingly, provision of access to the media to the client device 160 may occur prior to completion of the communicating of the media to the source machine 130. Moreover, the communicating of the media may be performed in response to the providing of the availability notification by the availability module 610 of the client device 150. In some example embodiments, the communicating of the media may be in response to the reception of the request to access the media (e.g., received by the reception module 620 of the client device 150), the provision of access to the media (e.g., by the provision module 630 of the client device 150, or any suitable combination thereof (e.g., as one or more indicators of demand or popularity for the media).

In some example embodiments, the upload module 640 of the client device 150 communicates the media as a sequence of multiple versions of the media. For example, the upload module 640 may send increasingly higher quality versions of the media to the source machine 130 (e.g., a first version, followed by a second version that is an improvement upon the first version). A low-resolution version may be sent prior to a high-resolution version. A highly compressed version may be sent prior to an uncompressed version. As another example, the upload module 640 may send a version of the media to the source machine 130 prior to sending an improvement (e.g., additional media content or information describing differences between the version and a high quality version) to the version of the media.

The media editor software 650 of the client device 150, as noted above, may configure the client device 150 to generate media (e.g., one or more pieces of media), present media, or both. The media editor software 650 may be executed to generate media content (e.g., a first media frame) based on one or more media frames (e.g., based on a second media frame). For example, the media editor software may be or include a non-linear editor (e.g., a non-linear video editor, a non-linear audio editor, or both). As noted above, the media editor software 650 may include an interface (e.g., a user interface) that is operable by the user 152 to specify the generation of a media frame (e.g., a first media frame) based on one or more media frames (e.g., a second media frame, or a second media frame and a third media frame). In some example embodiments, the client device 150 executes the media editor software 650 as a software application (e.g., a standalone software application). In certain example embodiments, the client device 150 executes the media editor software 650 in conjunction with additional software in the form of an application, a plug-in for an application, an applet, or a mobile app that configures the client device 150 to communicate with the media editing system 105. Such additional software may be provided to the client device 150 by one or more machines of the media editing system 105 (e.g., render machine 110, storage machine 120, or source machine 130). In various example embodiments, the media editor software 650 itself is provided (e.g., as a download or update) to the client device 150 by one or more machines of the media editing system 105.

In some example embodiments, the media editor software 650 of the client device 150 is configured to receive software (e.g., client software) that, when executed by the client device 150, configures the client device 150 as a client of the media editing system 105. The software may be client software that is received from one or more machines of the media editing system 105 (e.g., render machine 110, storage machine 120, or source machine 130). For example, the client software may include an application, a plug-in for an application, an applet, or a mobile app that configures the client device 150 to communicate with the media editing system 105. The client software may include one or more of the modules discussed herein with respect to FIG. 6 (e.g., availability module 610, reception module 620, provision module 630, and upload module 640) or one or more portions thereof. Accordingly, the client software may configure the client device 150 to perform one or more functions described above with respect to the availability module 610, the reception module 620, the provision module 630, the upload module 640, or any suitable combination thereof. In some example embodiments, a client device (e.g., client device 150) may be configured to function, permanently or temporarily, as a render machine (e.g., similar to the render machine 110) or a source machine (e.g., similar to the source machine 130) within the media editing system 105, and the client software accordingly may include one or more of the modules discussed above with respect to FIG. 2

The camera 660 of the device 150 is configured to capture one or more images (e.g., as one or more media frames, such as video frames). The camera 660 may include hardware configured to capture an image (e.g., a charge-coupled device (CCD)), software configured to generate an image or control image-capture hardware, or any suitable combination thereof. For example, the camera 660 may generate pixels of a video frame, and the client device 150 may use the camera 660 to generate the pixels of the video frame. According to various example embodiments, the camera 660 may be a peripheral or an accessory that is internal or external to the device 150. In some example embodiments, the device 150 accesses (e.g., reads or receives) one or more images in digital form from a memory (e.g., a memory card or memory cartridge, optical or magnetic) or from a storage device (e.g., a solid-state storage drive, a disk drive, or a tape drive). In such example embodiments, the camera 660 may be replaced by such a memory or storage device.

The microphone 670 of the device 150 is configured to capture one or more sounds (e.g., as one or more media frames, such as audio frames). The microphone 670 may include hardware configured to capture one or more audio samples, software configured to generate or process audio samples, or any suitable combination thereof. For example, the microphone 670 may generate audio data of an audio frame, and the client device 150 may use the microphone 670 to generate the audio data of the audio frame. According to various example embodiments, the microphone 670 may be a peripheral or an accessory that is internal or external to the device 150. In some example embodiments, the device 150 accesses one or more sounds in digital form from a memory or from a storage device. In such example embodiments, the microphone 670 may be replaced by such a memory or storage device.

Figure 7:
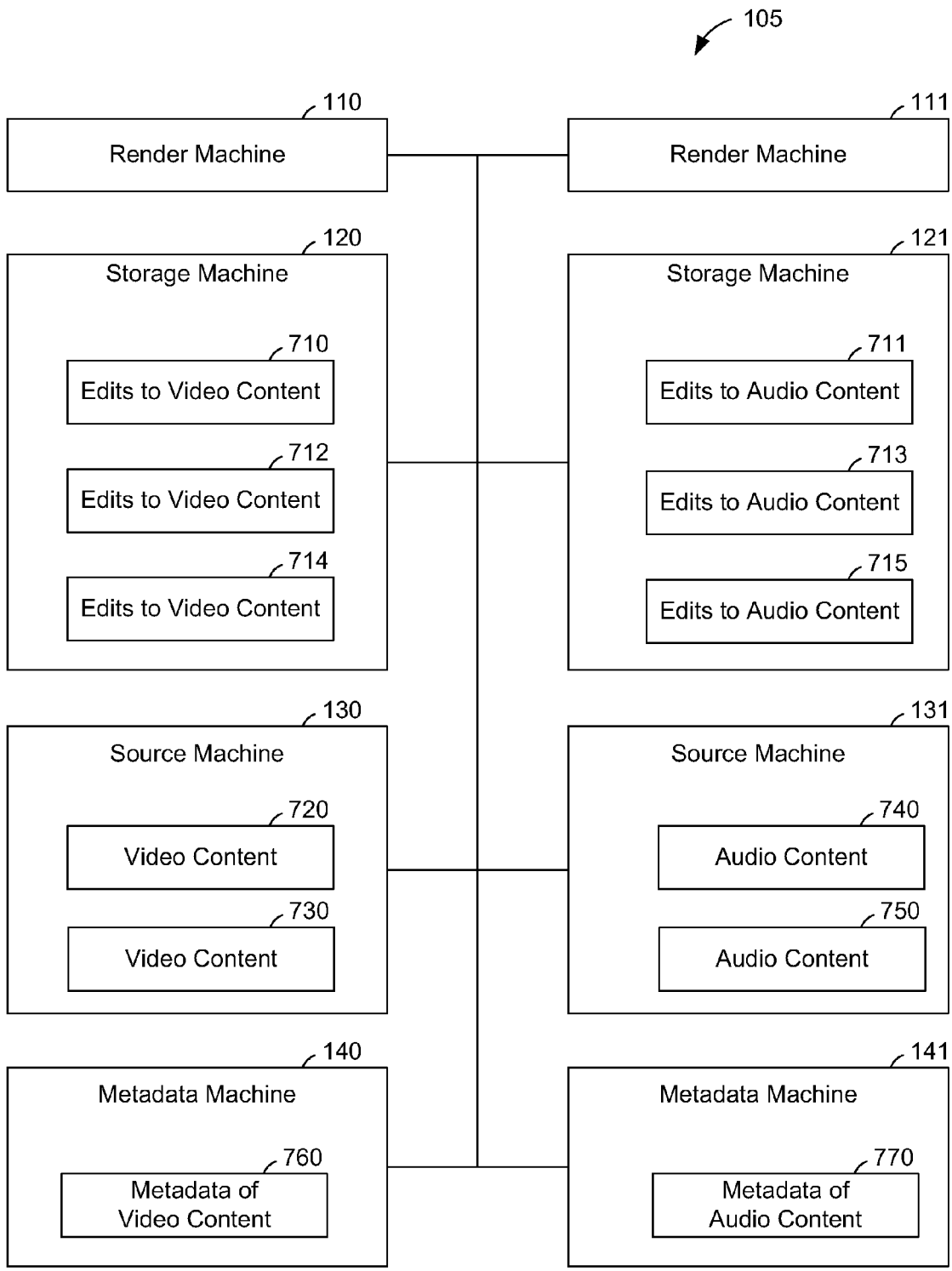
FIG. 7 is a block diagram illustrating data structures within a collaborative media editing system, according to some example embodiments.

FIG. 7 is a block diagram illustrating data structures within the media editing system 105, according to some example embodiments. The render machine 110 may store one or more pieces of media (e.g., media frames), one or more edits (e.g., specified by one or more media projects), one or more descriptors (e.g., as examples of metadata) of a piece of media, or any suitable combination thereof. Moreover, the render machine 110 may store, permanently or temporarily, any of the information described above with respect to FIG. 2. As noted above, the render machine 111 may be configured similarly to the render machine 110 and hence may store one or more pieces of media, one or more edits, one or more descriptors of a piece of media, or any suitable combination thereof, as well as configured to store (e.g., currently or temporarily) any of the information described above with respect to FIG. 2.

As shown, the storage machine 120 stores edits 710, 712, and 714 (e.g., via the storage module 320 of the storage machine 120). The edits 710, 712, and 714 are edits to media content (e.g., a media frame) and are shown in FIG. 7 as sets of edits to video content (e.g., video content 720), though one or more of the edits 710, 712, and 714 may include one or more edits to non-video content (e.g., audio content), according to various example embodiments. As shown, the storage machine 121 stores edits 711, 713, and 715. The edits 711, 713, and 715 are edits to media content (e.g., a media frame) and are shown in FIG. 7 as sets of edits to audio content (e.g., audio content 740), though one or more of the edits 711, 713, and 715 may include one or more edits to non-audio content (e.g., video content), according to various example embodiments.

As shown, the source machine 130 stores video content 720 and 730 (e.g., via the storage module 420 of the source machine 130). The video content 720 and 730 each may include one or more video frames (e.g., as examples of media frames). In some example embodiments, the video content 720, 730, or both, may be replaced with non-video content (e.g., audio content). Although the video content 720 and 730 are shown as being stored on a single source machine 130, the video content 720 and 730 may be stored on separate source machines (e.g., source machine 130 and source machine 131), according to various example embodiments. As shown, the source machine 131, stores audio content 740 and 750. The audio content 740 and 750 each may include one or more audio frames (e.g., as examples of media frames). In some example embodiments, the audio content 740, 750, or both, may be replaced with non-audio content (e.g., video content). Although the audio content 740 and 750 are shown as being stored on a single source machine 131, the audio content 740 and 750 may be stored on separate source machines (e.g., source machine 130 and source machine 131).

As shown, the metadata machine 140 stores metadata 760 (e.g., via the metadata module 520 of the metadata machine 140). The metadata 760 is shown as metadata of video content (e.g., video content 720), though the metadata 760 may be metadata of non-video content (e.g., audio content 740). As shown, the metadata machine 141 stores metadata 770. The metadata 770 is shown as metadata of audio content (e.g., audio content 740), though the metadata 770 may be metadata of non-audio content (e.g., video content).

Figure 8:
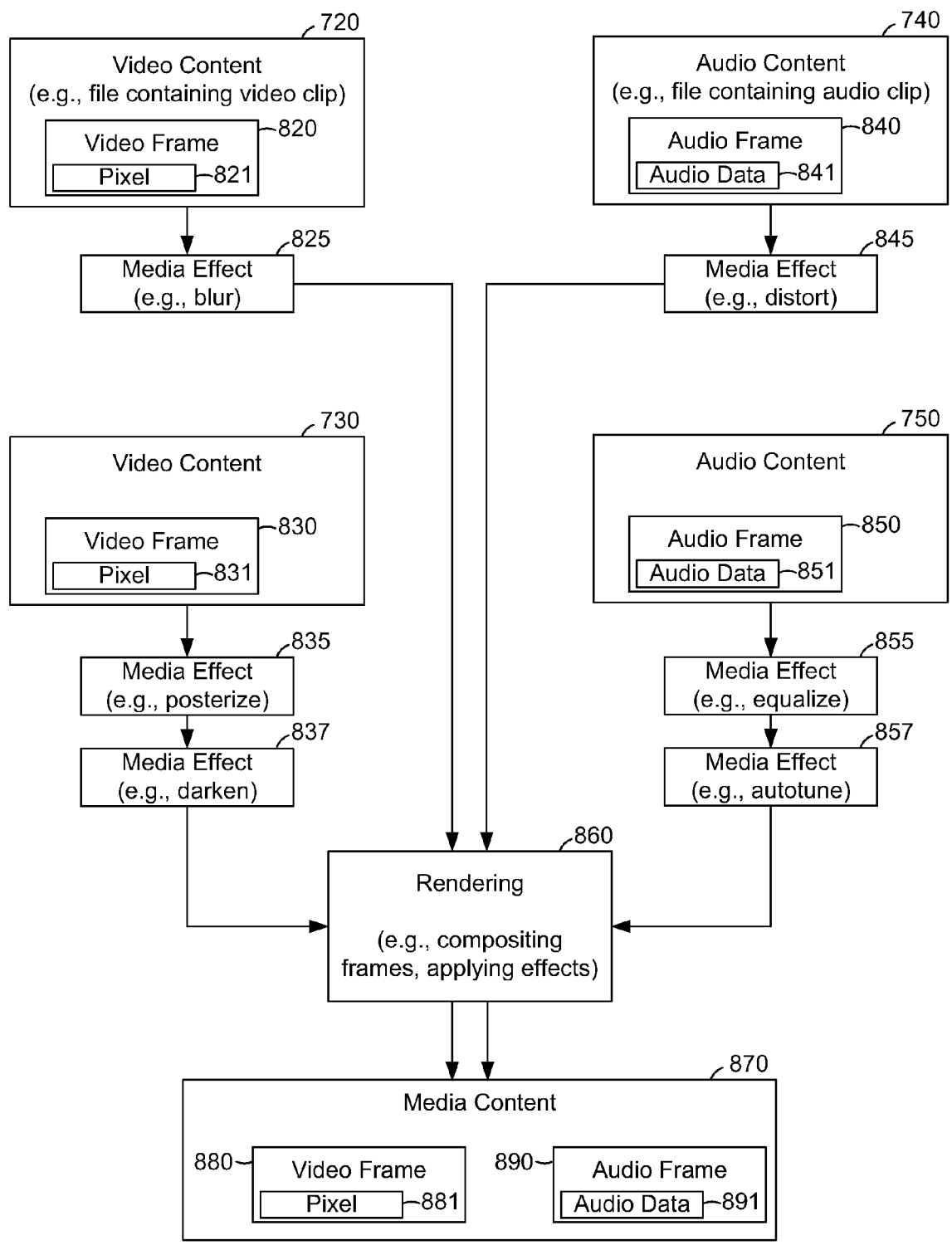
FIG. 8 is a conceptual diagram illustrating edits being applied to media to generate media content, according to some example embodiments.

FIG. 8 is a conceptual diagram illustrating edits being applied to media to generate media content, according to some example embodiments. As shown, media content 870 is generated by a rendering operation 860, or the rendering operation 860 generates the media content 870 based on the video content 720 and 730 and the audio content 740 and 750.

The video content 720 may be a video clip (e.g., a file containing a video clip) composed of one or more video frames. The video content 720 may include a video frame 820, which may include a pixel 821 (e.g., among multiple pixels of the video frame 820). As shown, a media effect 825 (e.g., a blur operation) may be applied or specified for application (e.g., by one or more edits) to the video content 720 or a portion thereof (e.g., to the video frame 820 or to the pixel 821) prior to the rendering operation 860.

The video content 730 similarly may be a video clip composed of one or more video frames. The video content 730 may include a video frame 830, which may include a pixel 831 (e.g., among multiple pixels of the video frame 830). As shown, media effects 835 and 837 (e.g., a posterize operation and a darken operation) may be applied or specified for application (e.g., by one or more edits) to the video content 730 or a portion thereof (e.g., to the video frame 830 or to the pixel 831) prior to the rendering operation 860.

The audio content 740 may be an audio clip (e.g., a file containing an audio clip) composed of one or more audio frames. The audio content 740 may include an audio frame 840, which may include audio data 841 (e.g., an audio sample among multiple audio samples of the audio frame 840). As shown, a media effect 845 (e.g., a distortion operation) may be applied or specified for application (e.g., by one or more edits to the audio content 740 or a portion thereof (e.g., to the audio frame 840 or to the audio data 841) prior to the rendering operation 860.

The audio content 750 similarly may be an audio clip composed of one or more audio frames. The audio content 750 may include an audio frame 850, which may include audio data 851 (e.g., an audio sample among multiple audio samples of the audio frame 850). As shown, media effects 855 and 857 (e.g., an equalize operation and an autotune operation) may be applied or specified for application (e.g., by one or more edits) to the audio content 750 or portion thereof (e.g., to the audio frame 850 or to the audio data 851) prior to the rendering operation 860.

The rendering operation 860 may generate the media content 870 based on one or more of the video content 720, the video content 730, the audio content 740, and the audio content 750. In some example embodiments, the rendering operation 860 applies one or more of the media effects 825, 835, 837, 845, 855, and 857 prior to, during, or as part of the rendering operation 860. The media content 870 may include a video frame 880, which may include a pixel 881 (e.g., among multiple pixels), and an audio frame 890, which may include audio data 891 (e.g., an audio sample among multiple audio samples).

For example, the rendering operation 860 may include compositing the video frame 820 and the video frame 830 to generate the video frame 880. In some example embodiments, the pixel 881 is generated based on (e.g., by compositing) the pixel 821 and the pixel 831. As another example, the rendering operation 860 may include compositing the audio frame 840 and the audio frame 850. In some example embodiments, the audio data 891 is generated based on the audio data 841 and the audio data 851.

According to various example embodiments, the rendering operation 860 generates the video frame 880 based on the video frame 820 (e.g., without the video frame 830). For example, the rendering operation 860 may apply the media effect 825 to the video frame 820 and thereby generate the video frame 880. Specifically, the pixel 881 may be generated by the rendering operation 860 by applying the media effect 825 to the pixel 821. Similarly, in certain example embodiments, the rendering operation 860 generates the audio frame 890 based on the audio frame 840 (e.g., without the audio frame 850). For example, the rendering operation 860 may apply the media effect 845 to the audio frame 840 and thereby generate the audio frame 890. Specifically, the audio data 891 may be generated by the rendering operation 860 by applying the media effect 845 to the audio data 841.

Figure 9:
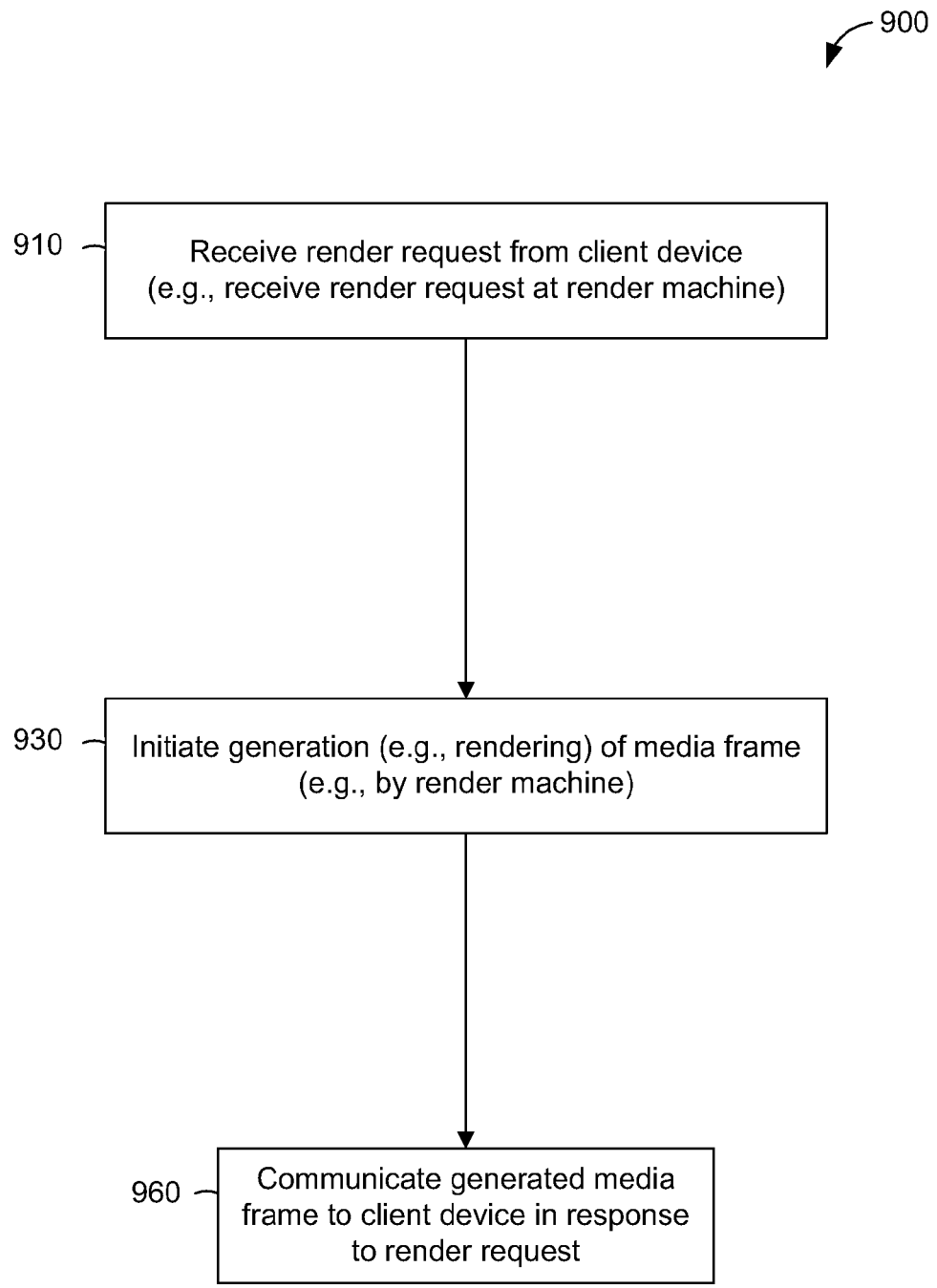
FIG. 9-10 are flowcharts illustrating operations in a method of collaborative media editing, according to some example embodiments.
Figure 10:
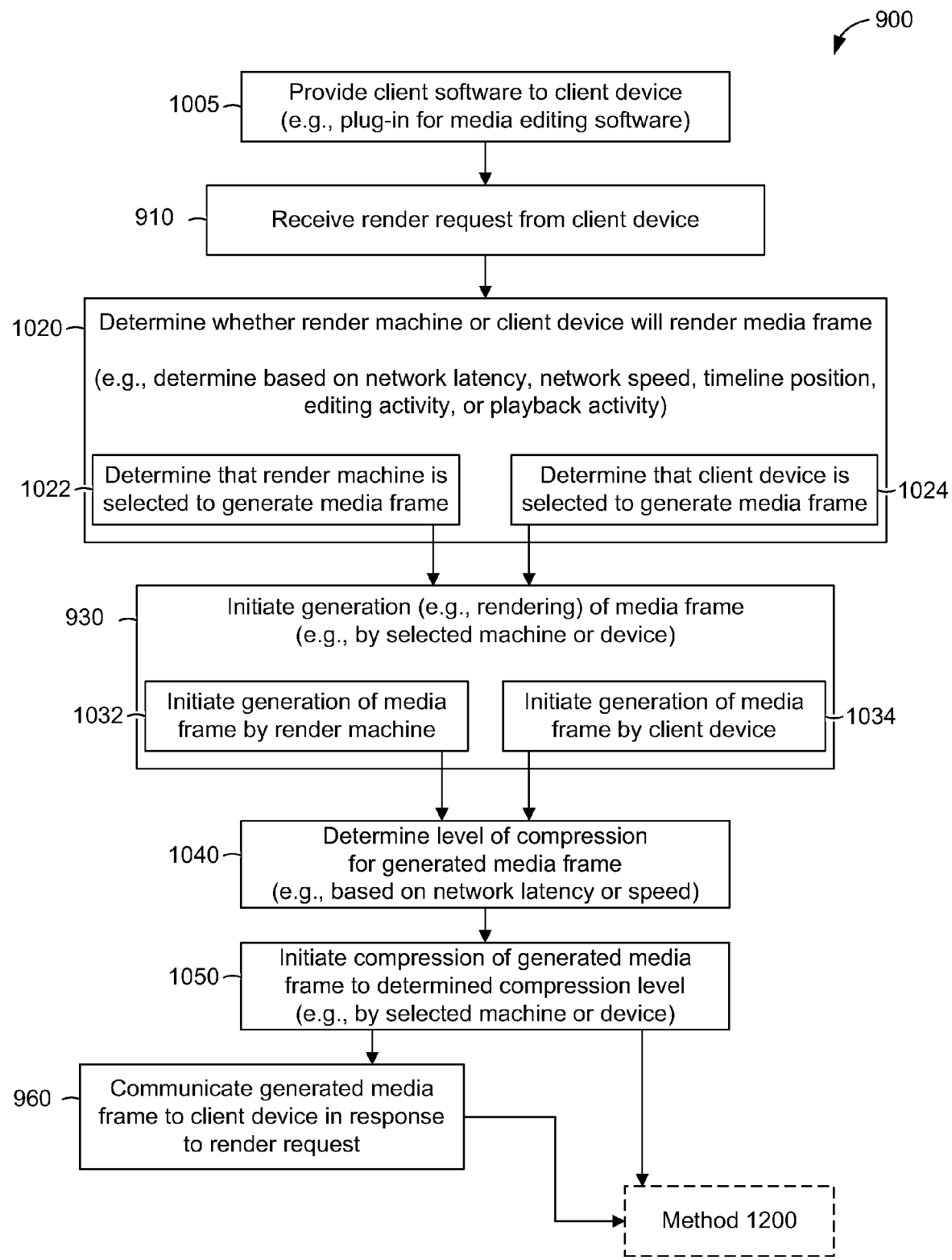

FIG. 9-10 are flowcharts illustrating operations in a method 900 of collaborative media editing, according to some example embodiments. Operations in a method 900 may be performed by a render machine (e.g., render machine 110) within the media editing system 105, using modules as described above with respect to FIG. 2. As shown in FIG. 9, some example embodiments of the method 900 include operations 910, 930, and 960.

In operation 910, the reception module 210 of the render machine 110 receives a render request from the client device 150. The render request may specify that a first media frame be generated based on a second media frame. The second media frame may be stored by the source machine 130 (e.g., via the storage module 320 of the source machine 130).

In operation 930, the generation module 220 of the render machine 110 initiates generation of the first media frame (e.g., by the render machine 110 or by the client device 150). For example, the generation module 220 may initiate generation of the first media frame by the render machine 110 (e.g., via the generation module 220), and this generation of the first media frame by the render machine 110 may include accessing the second media frame from the source machine 130. For example, the generation module 220 may access the second media frame from the source machine 130 as a result of the second media frame being absent from the client device 150. Moreover, the generating of the first media frame based on the second media frame may be in response to the render request received in operation 910, in accordance with the render request, or both.

In some example embodiments, the first media frame and the second media frame are video frames 820 and 880, respectively, and the generation of the first media frame may include modifying the pixel 821 to generate the pixel 881, as discussed above with respect to FIG. 8. In certain example embodiments, the first media frame and the second media frame are audio frames 840 and 890, respectively, and the generation of the first media frame may include modifying the audio data 841 to generate the audio data 891, as discussed above with respect to FIG. 8.

According to some example embodiments, the render request received in operation 910 specifies that the second media frame (e.g., video frame 820 or audio frame 840) be composited with a third media frame (e.g., video frame 830 or audio frame 850) in the generation of the first media frame (e.g., video frame 880 or audio frame 890). In response to such a render request, the generation of the first media frame may include compositing (e.g., via rendering operation 860) the second media frame with the third media frame. As noted above with respect to FIG. 8, the second media frame and the third media frame may be stored on a separate source machines (e.g., source machines 130 and 131).

According to certain example embodiments, the render request received in operation 910 specifies that the second media frame (e.g., video frame 820 or audio frame 840) be modified by application of a media effect (e.g., media effect 825 or media effect 845) to generate the first media frame (e.g., video frame 880 or audio frame 890). In response to such a render request, the generation of the first media frame may include applying the media effect to the second media frame.

In operation 960, where the render machine 110 (e.g., via the generation module 220) generates the first media frame, the communication module 230 of the render machine 110 communicates the generated first media frame to the client device 150. The communication of the generated first media frame may be in response to the render request received in operation 910.

As shown in FIG. 10, some example embodiments of the method 900 include one or more of operations 1005, 1020, 1022, 1024, 1032, 1034, 1040, and 1050. In operation 1005, the communication module 230 of the render machine 110 provides client software to the client device 150. The client software may configure the client device 150 to communicate the render request received in operation 910, receive the generated first media frame communicated in operation 960, or both. In some example embodiments, the client software may configure the client device 150 to generate the render request (e.g., such that the render request specifies that the first media frame be generated based on the second media frame). In some example embodiments, the client software interacts with the media editor software 650 (e.g., a non-linear editing application) of the client device 150. For example, the media editor software 650 (e.g., as executed by the client device 150 and as operated by the user 152) may configure the client device 150 to download, install, and execute the client software or a portion thereof. As another example, the media editor software 650 may configure the client device 150 to initiate generation of the render request received in operation 910 by executing the client software or a portion thereof.

In operation 1020, the determination module 240 of the render machine 110 determines whether the client device 150 is selected to generate the first media frame. In some example embodiments, operation 1020 includes operation 1022, in which the render machine 110 is selected to generate the first media frame. In alternative example embodiments, operation 1020 includes operation 1024, in which the client device 150 is selected to generate the first media frame.

According to various example embodiments, operation 1020 may be performed based on an indicator of latency in the network 190 (e.g., accessed or received by the determination module 240), an indicator of a data rate in a network 190 (e.g., accessed or received by the determination module 240), or both. Moreover, according to certain example embodiments, operation 1020 may be performed based on a position for the first media frame to occupy within a timeline (e.g., in a graphical user interface) presented by the client device 150. Furthermore, according to some example embodiments, operation 1020 may be performed based on (e.g., as a result of, or initiated by) the media editor software 650 of the client device 150 being executed by the client device 150. For example, the media editor software 650 may function as a media editing tool, and operation 1020 may be performed based on the media editor software 650 being executed to generate media content (e.g., video frame 880 or audio frame 890) based on the second media frame (e.g., video frame 820 or audio frame 840). As another example, the media editor software 650 may function as a media player tool, and operation 1020 may be performed based on the media editor software 650 being executed to present (e.g., play) media content (e.g., video frame 880 or audio frame 890) based on the second media frame (e.g., video frame 820 or audio frame 840).

In operation 1022, the determination module 240 determines that the render machine 110 is selected to generate the first media frame (e.g., despite the client device 150 being available to generate the first media frame). In such situations, the initiated generating of the first media frame, discussed above with respect to operation 930, may be performed by the render machine 110 (e.g., by the generation module 220 of the render machine 110) in response to the determining that the render machine 110 is selected to generate the first media frame.

In operation 1024, the determination module 240 determines that the client device 150 is selected to generate the first media frame (e.g., despite the render machine 110 being available to generate the first media frame). In such situations, the initiated generating of the first media frame, discussed above with respect to operation 930, may be performed by the client device 150 (e.g., by the media editor software 650 of the client device 150) in response to the determining that the client device 150 is selected to generate the first media frame.

According to various example embodiments, operation 930, which is discussed above with respect to FIG. 9, includes operation 1032. In operation 1032, the generation module 220 of the render machine 110 initiates generation of the first media frame by a render machine (e.g., render machine 110). For example, the generation module 220 may initiate the generation of the media frame by the render machine 110 when it is determined (e.g., in operation 1022) that the render machine is selected to generate the first media frame (e.g., when the client device 150 is not selected to generate the first media frame). In alternative example embodiments, operation 930 includes operation 1034. In operation 1034, the generation module 220 initiates generation of the first media frame by a client device (e.g., the client device 150). As an example, the generation module 220 may initiate the generation of the media frame by the client device 150 when it is determined (e.g., in operation 1024) that the client device 150 is selected to generate the first media frame.

In operation 1040, the determination module 240 of the render machine 110 determines a level of compression (e.g., high compression or low compression) for the first media frame, a resolution (e.g., high-resolution or low-resolution) for the first media frame, or both. As noted above, the generation of the first media frame may be initiated in operation 930. In some example embodiments, operation 1040 is performed based on an indicator of latency in the network 190 (e.g., accessed or received by the determination module 240), an indicator of a data rate in a network 190 (e.g., accessed or received by the determination module 240), or both.

In operation 1050, the generation module 220 of the render machine 110 initiates compression of the first media frame (e.g., during or after generation of the first media frame). The compression of the first media frame may be initiated based on (e.g., according to) the level of compression determined in operation 1040. Moreover, the compression of the first media frame may be initiated in response to the generation of the first media frame (e.g., by the generation module 220).

Figure 11:
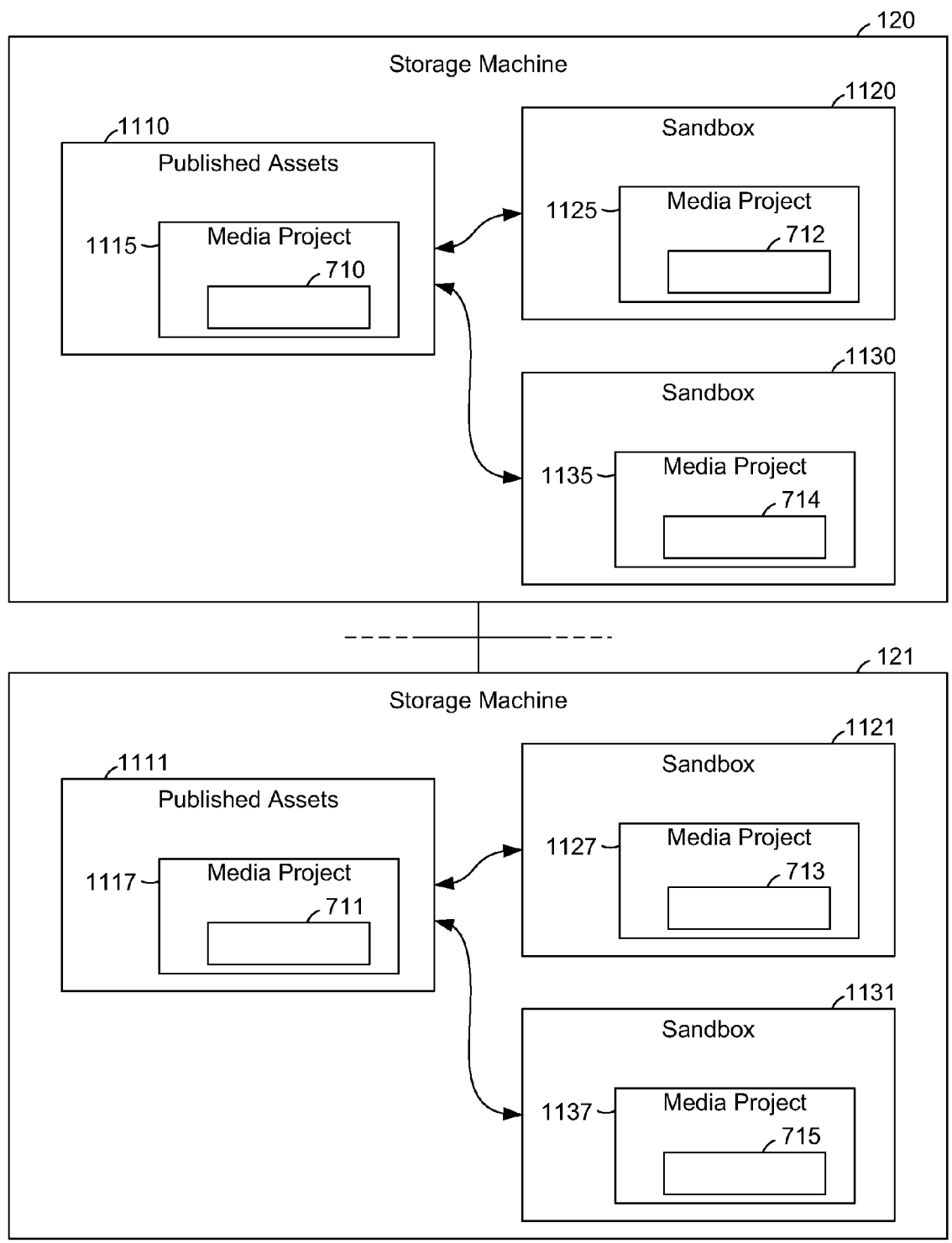
FIG. 11 is a block diagram illustrating data structures within storage machines in a collaborative media editing system, according to some example embodiments.

FIG. 11 is a block diagram illustrating data structures within the storage machines 120 and 121 in the media editing system 105, according to some example embodiments. As noted above with respect to FIG. 7, the storage machine 120 may store edits 710, 712, and 714, and the storage machine 121 may store edits 711, 713, and 715. Each of the edits 710-715 may be a set of one or more edits to a piece of media (e.g., one or more media frames).

As shown in FIG. 11, the edits 710 may be included in, or otherwise specified by (e.g., referenced by), a media project 1115. Moreover, the media project 1115 may be included in or otherwise specified by published assets 1110 (e.g., as an asset among multiple published assets 1110). Hence, the media project 1115 may be an asset with respect to the media editing system 105, and such an asset may be published or public (e.g., accessible for editing by multiple client devices).

In contrast to the published assets 1110, a group of one or more media projects may include or otherwise specify an asset that is unpublished or private (e.g., accessible by only one client device or by no client device). Such a group of media projects may be termed a "sandbox." Accordingly, a sandbox 1120 may be associated with (e.g., may correspond to) the published assets 1110, and the sandbox 1120 may include or otherwise specify a media project 1125, where the media project 1125 may include or otherwise specify the edits 712. Moreover, the media project 1125 may be an unpublished or private version of the published or public media project 1115. Similarly, a sandbox 1130 may be associated with the published assets 1110, and the sandbox 1130 may include or otherwise specify a media project 1135, where the media project 1135 may include or otherwise specify the edits 714. The media project 1135 may be an unpublished or private version of the published or public media project 1115.

As shown in FIG. 11, the edits 711 may be included in, or otherwise specified by (e.g., referenced by), a media project 1117. Moreover, the media project 1117 may be included in or otherwise specified by published assets 1111 (e.g., as an asset among multiple published assets 1111). Hence, the media project 1117 may be an asset with respect to the media editing system 105, and such an asset may be published or public.

According to some example embodiments, a sandbox 1121 may be associated with (e.g., may correspond to) the published assets 1111, and the sandbox 1121 may include or otherwise specify a media project 1127, where the media project 1127 may include or otherwise specify the edits 713. Moreover, the media project 1127 may be an unpublished or private version of the published or public media project 1117. Likewise, a sandbox 1131 may be associated with the published assets 1111, and the sandbox 1131 may include or otherwise specify a media project 1137, where the media project 1137 may include or otherwise specify the edits 715. The media project 1137 may be an unpublished or private version of the published or public media project 1117.

Figure 12:
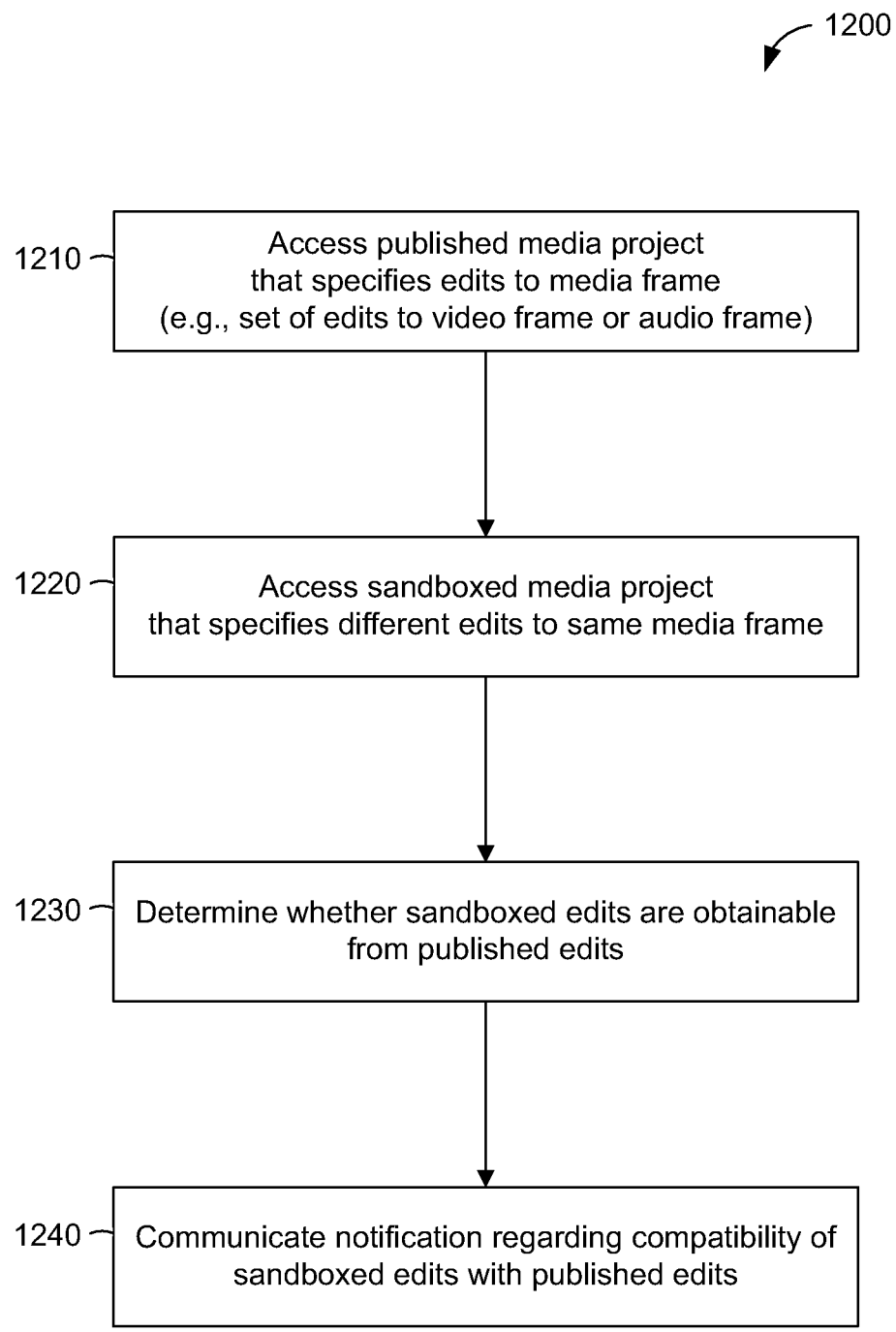
FIG. 12-13 are flowcharts illustrating operations in a method of conflict resolution among media edits, according to some example embodiments.
Figure 13:
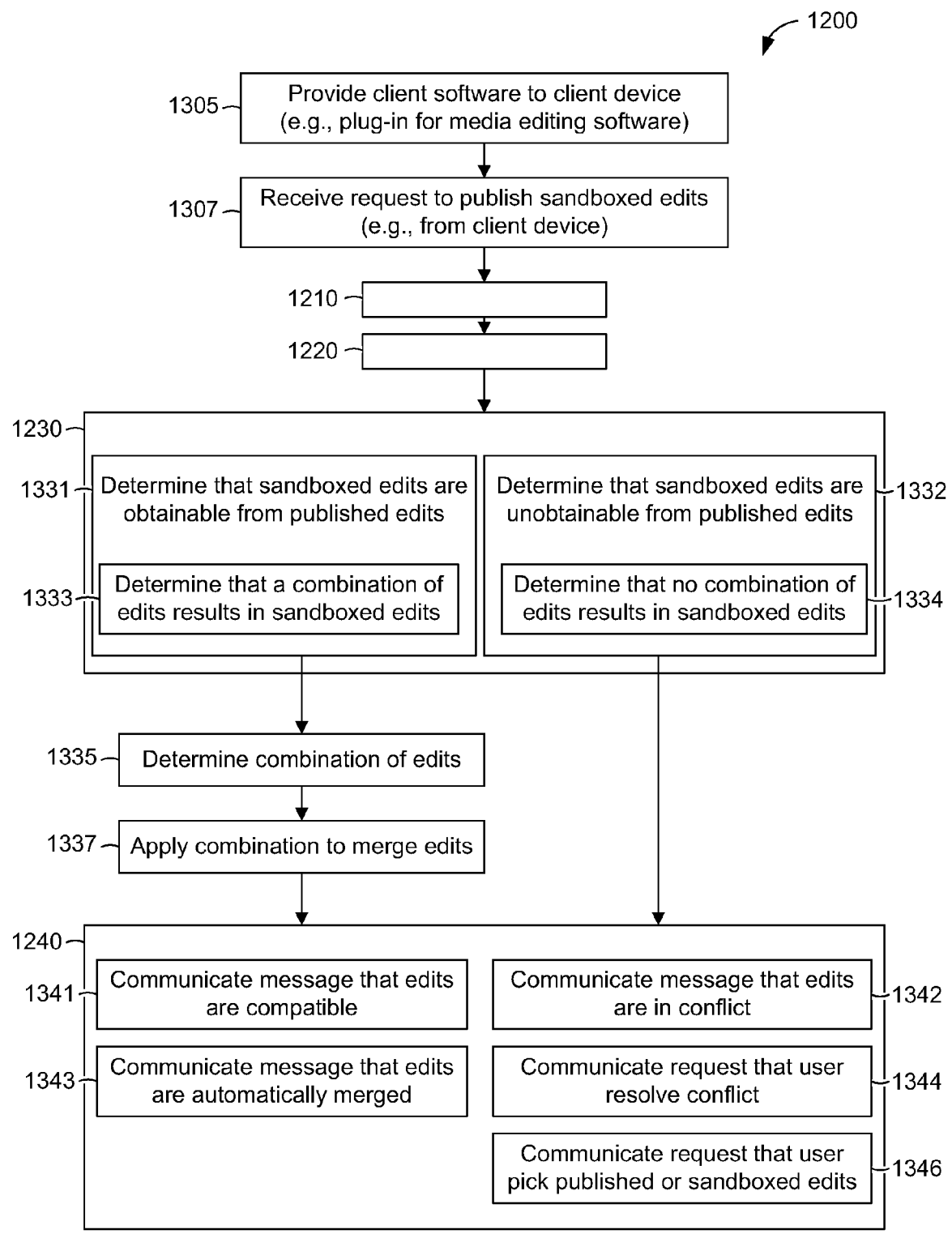

FIG. 12-13 are flowcharts illustrating operations in a method 1200 of conflict resolution among media edits, according to some example embodiments. Operations in the method of 1200 may be performed by a storage machine (e.g., storage machine 120) within the media editing system 105, using modules as described above with respect to FIG. 3. As shown in FIG. 12, some example embodiments of the method 1200 include operations 1210, 1220, 1230, and 1240.

In operation 1210, the storage module 320 of the storage machine 120 accesses the media project 1115 (e.g., a first media project) stored by the storage machine 120 (e.g., via the storage module 320 of the storage machine 120). As noted above, the storage machine 120 is communicatively coupled to the client device 150 (e.g., by the network 190), and the media project 1115 may specify edits 710 (e.g., a first set of edits). As also noted above, the edits 710 may be a set of one or more edits to a media frame, and the media frame may be stored by a source machine (e.g., source machine 130) within the media editing system 105. As further noted above, the media project 1115 may be a published or public media project (e.g., in contrast to an unpublished, private, or "sandboxed" media project).

In operation 1220, the storage module 320 of the storage machine 120 accesses the media project 1125 (e.g., a second media project). As noted above, the media project 1120 may be stored by the storage machine 120, and the media project 1120 may specify edits 720 (e.g., a second set of edits). As also noted above, the edits 720 may be a set of one or more edits to the same media frame that corresponds to the edits 710. As further noted above, the media project 1125 may be an unpublished, private, or "sandboxed" media project (e.g., in contrast to a published or public media project).

In operation 1230, the conflict module 340 of the storage machine 120 determines whether the media project 1125, the edits 712, or both, are obtainable from the media project 1115, the edits 710, or both. As discussed above with respect to FIG. 3, the edits 712 are obtainable from the edits 710 if there exists at least one combination of available edits that, when applied to the edits 710, results in the edits 712. In some example embodiments, the edits 712 are obtainable from the media project 1115 if the edits 712 can be combined with the edits 710 and produce an unambiguous result for the media project 1115. In certain example embodiments, the edits 710 Further details of operation 1230 are discussed below with respect to FIG. 13.

In operation 1240, the communication module 330 of the storage machine 120 communicates a notification regarding compatibility (e.g., compatibility or incompatibility) of the media project 1125, the edits 712, or both, with the media project 1115, the edits 710, or both. Further details of operation 1240 are discussed below with respect to FIG. 13.

As shown in FIG. 13, some example embodiments of the method 1200 include one or more of operations 1305, 1307, 1331, 1332, 1333, 1334, 1335, 1337, 1341, 1342, 1343, 1344, and 1346. For convenience, operations 1210 and 1220, which are described above with respect to FIG. 12, are also shown in FIG. 13.

In operation 1305, the communication module 330 of the storage machine 120 provides software (e.g., client software in the form of an application, a plug-in for an application, an applet, or a mobile app) to the client device 150 (e.g., as a plug-in to the media editor software 650 of the client device 150). As noted above, the software may configure the client device 150 to access a media frame that corresponds to the edits 710 and the edits 720. Moreover, the provided software may configure the client device 150 to specify (e.g., by sending one or more requests to the reception module 310 of the storage machine 120) one or more of the edits 710 and 720. Hence, one or both of operations 1210 and 1220 may be performed in response to the specification of the one or more of the edits 710 and 720 by the client device 150.

In operation 1307, the reception module 310 of the storage machine 120 receives a request to publish or make public the media project 1125 (e.g., a second media project), the edits 712 (e.g., the second set of edits), or both. The request may be received from the client device 150. In example embodiments that include operation 1307, operation 1230 and any operations performed as a part of operation 1230 may be performed in response to the receiving of the request received in operation 1307.

In some example embodiments, one or more of operations 1331 and 1333 may be performed as part (e.g., a precursor task, a subroutine, or a portion) of operation 1230. In operation 1331, the conflict module 340 of the storage machine 120 determines that the edits 712 (e.g., the second set of edits) are obtainable from the edits 710 (e.g., the first set of edits). Operation 1333 may be performed as part of operation 1331. In operation 1333, the conflict module 340 determines that a combination of available edits, when applied to the edits 710 (e.g., the first set of edits), results in the edits 712 (e.g., the second set of edits). For example, the conflict module 340 may determine that such a combination exists.

In alternative example embodiments, one or more of operations 1332 and 1334 may be performed as part of operation 1230. In operation 1332, the conflict module 340 of the storage machine 120 determines that the edits 712 (e.g., the second set of edits) are unobtainable from the edits 710 (e.g., the first set of edits). Operation 1334 may be performed as part of operation 1332. In operation 1334, the conflict module 340 determines that no combination of available edits results in the edits 712 (e.g., the second set of edits) when applied to the edits 710 (e.g., the first set of edits). For example, the conflict module 340 may determine that no such combination exists.

In operation 1335, where the determination module 340 of the storage machine 120 has performed operation 1331, operation 1333, or both, the conflict module 340 may determine the combination of available edits that, when applied to the edits 710 (e.g., the first set of edits), results in the edits 712 (e.g., the second set of edits). For example, the conflict module 340 may determine one or more of the available edits in the combination, as well as an arrangement (e.g., sequential order) of those one or more available edits.

In operation 1337, the conflict module 340 of the storage machine 120 initiates application of the combination of available edits to the edits 710 (e.g., the first set of edits) or a portion thereof (e.g., one or more edits within the edits 710), as described above with respect to FIG. 3. As initiated by the conflict module 340, the application of the combination to the edits 710 may be performed by the conflict module 340, the generation module 220 of the render machine 110, or any suitable combination thereof. Accordingly, operation 1337 may include applying the combination of available edits to one or more edits within the edits 710 (e.g., the first set of edits).

In some example embodiments, one or more of operations 1341 and 3043 may be performed as part (e.g., a precursor task, a subroutine, or a portion) of operation 1240. In operation 1341, the communication module 330 of the storage machine 120 communicates a message that the media project 1115 (e.g., a first media project), the edits 710 (e.g., a first set of edits), or both, are compatible with the media project 1125 (e.g., a second media project), the edits 712 (e.g., a second set of edits), or both. In operation 1343, the communication module 330 communicates a message that the media project 1115 (e.g., the first media project), the edits 710 (e.g., the first set of edits), or both, are or have been automatically merged with the media project 1125 (e.g., the second media project), the edits 712 (e.g., the second set of edits), or both.

In alternative example embodiments, one or more of operations 1342, 1344, and 1346 may be performed as part of operation 1240. In operation 1342, the communication module 330 of the storage machine 120 communicates a message that the media project 1115 (e.g., the first media project), the edits 710 (e.g., the first set of edits), or both, are in conflict with the media project 1125 (e.g., the second media project), the edits 712 (e.g., the second set of edits), or both. In operation 1344, the communication module 330 communicates a request that the user 152 resolve a conflict between the media project 1115 (e.g., the first media project) and the media project 1125 (e.g., the second media project), or between the edits 710 (e.g., the first set of edits) and the edits 712 (e.g., the second set of edits). Such a request may be communicated to the client device 150. In operation 1346, the communication module 330 communicates a request that the user 152 choose from a list of multiple choices, where each of the multiple choices selects a solution to resolve the incompatibility between the media project 1115 (e.g., the first media project) and the media project 1125 (e.g., the second media project), or between the edits 710 (e.g., the first set of edits) and the edits 712 (e.g., the second set of edits). For example, one of the multiple choices may be selection of the media project 1115 (e.g., the first media project) over the media project 1125 (e.g., the second media project). As another example, one of the multiple choices may be selection of the media project 1125 (e.g., the second media project) over the media project 1115 (e.g., the first media project). In some example embodiments, both of these choices are included in the list of multiple choices.

Figure 14:
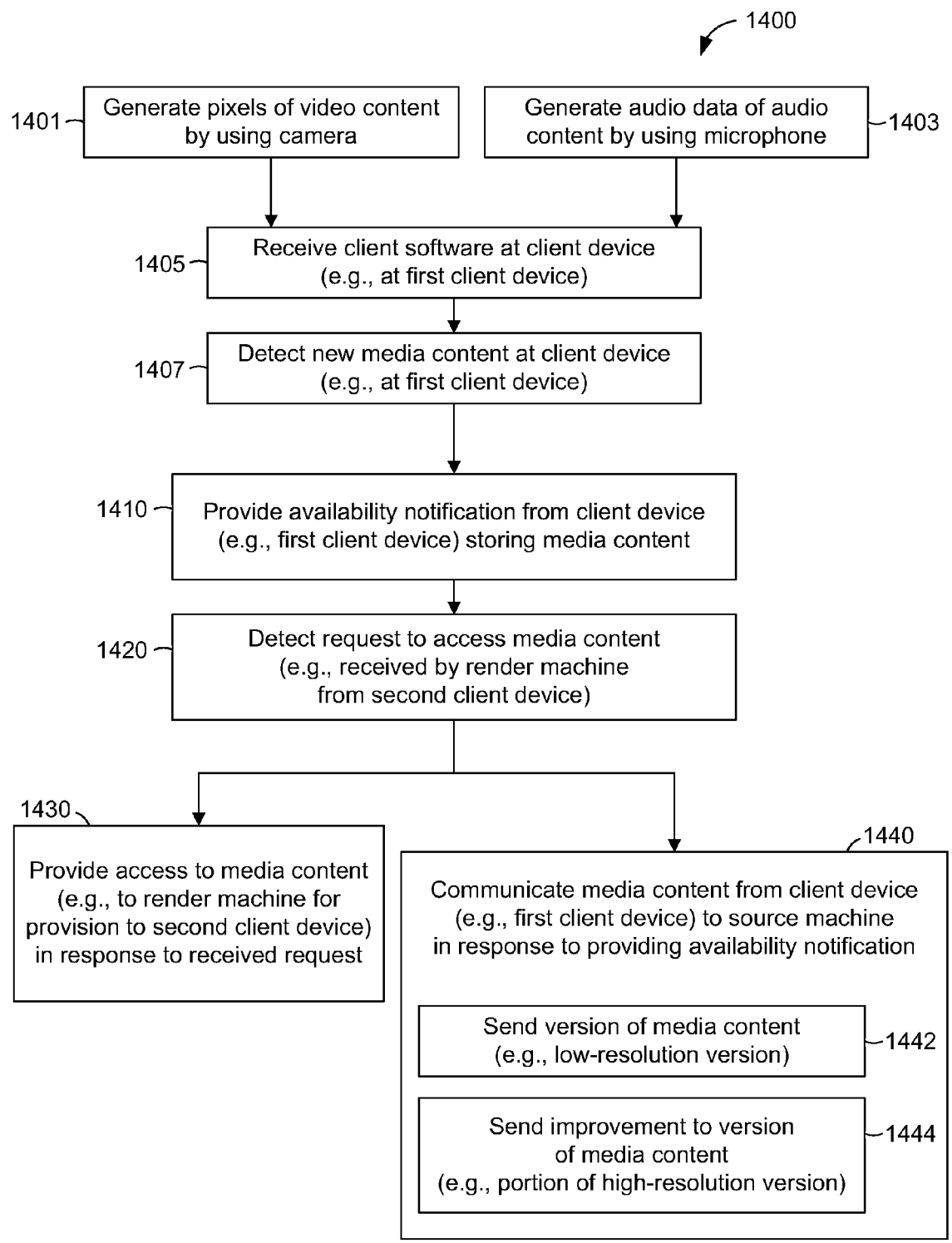
FIG. 14-15 are flowcharts illustrating operations in a method of providing access to media content stored at a client device in the context of a collaborative media editing system, according to some example embodiments.
Figure 15:
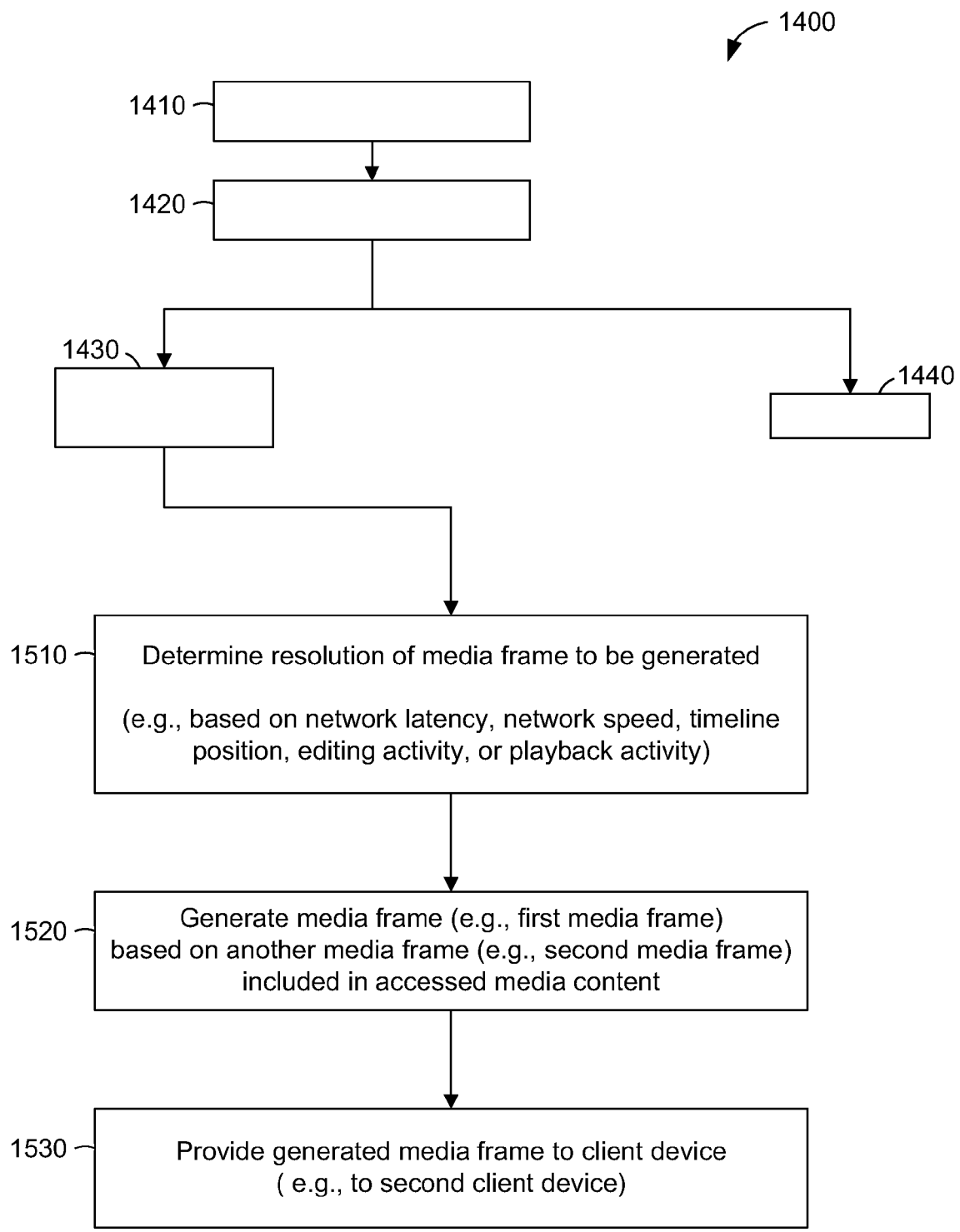

FIG. 14-15 are flowcharts illustrating operations in a method 1400 of providing access to media content stored at the client device 150 in the context of the media editing system 105, according to some example embodiments. Operations of the method 1400 may be performed by one or more modules of a client device (e.g., client device 150) of the media editing system 105, using modules as described above with respect to FIG. 6. With reference to FIG. 14, some example embodiments of the method 1400 include operations 1410, 1420, 1430, and 1440.

In operation 1410, the availability module 610 of the client device 150 provides an availability notification (e.g., a message, an alert, or an indication), as described above with respect to FIG. 6. As noted above, the availability notification may indicate that media (e.g., one or more pieces of media content) stored by the client device 150 is available for access. As also noted above, the availability notification may be provided to the media editing system 105 (e.g., source machine 130), to the client device 160, or any suitable combination thereof. In some example embodiments, the media stored by the client device 150 is absent from the client device 160, absent from the media editing system 105, or both.

In operation 1420, the reception module 620 of the client device 150 detects a request from the client device 160 to access the media stored by the client device 150, as described above with respect to FIG. 6. For example, the request may be a response to the availability notification provided in operation 1410, and the requests accordingly may be received in response to the availability notification provided in operation 1410. The request may be received by the render machine 110 (e.g., via the reception module 210) from the client device 160 (e.g., in response to the availability notification provided in operation 1410). Detection of the request may include receiving the request, receiving a copy of the request (e.g., as received by the render machine 110), receiving an indication that the request was received by the render machine 110, receiving a separate request from the render machine 110 for access to the media stored by the client device 150, or any suitable combination thereof.

In operation 1430, the provision module 630 of the client device 150 provides access to the media to the render machine 110, to the client device 160 (e.g., as described above with respect to FIG. 6), or any suitable combination thereof. As noted above, access to the media may be provided by allowing the media, or one or more portions thereof, to be read (e.g., retrieved, played, or copied) from the client device 150. As also noted above, access to the media may be provided by communicating the media or one or more portions thereof (e.g., to the device or machine from which the request for access was received).

In some example embodiments, the provision module 630 of the client device 150 provides the render machine 110 with access to the media content, in response to the request detected in operation 1420. Accordingly, the render machine 110 (e.g., via the reception module 210, the generation module 220, the communication module 230, the determination module 240, or any suitable combination thereof) may access the media content to fulfill the request detected in operation 1420. In some example embodiments, the render machine 110 may access a portion of the media content (e.g., a particular portion requested in the request that was detected in operation 1420), cache the portion of the media content (e.g., in memory or on a storage device), and provide the portion of the media content to the client device 160, in fulfillment of the request for access to the media content. This may have the effect of efficiently providing one or more portions of the media content to the client device 160, while the client device 150 is uploading the media content to the media editing system 105 (e.g., as described immediately below with respect to operation 1440).

In operation 1440, the upload module 640 of the client device 150 communicates the media to the media editing system 105 (e.g., to the source machine 130), as described above with respect to FIG. 6. As noted above, the communication of the media may be independent of the access to the media provided in operation 1430. Moreover, the communicating of the media may be performed in response to the providing of the availability notification in operation 1410, in response to the reception of the request to access the media in operation 1420, the provision of access to the media in operation 1430, or any suitable combination thereof. As noted above with respect to FIG. 6, the communicating of the media may include sending a version of the media prior to (e.g., followed by) sending an improvement to the communicated version of the media. In some example embodiments, operation 1430 is completed prior to completion of operation 1440.

According to various example embodiments, the method 1400 may include one or more of operations 1401, 1403, 1405, and 1407. In operation 1401, the camera 660 of the client device 150 generates at least a portion of the media stored by the client device 150. For example, the camera 660 may generate one or more pixels included in video content (e.g., a video frame) within the media. In some example embodiments, operation 1410 may be performed based on the camera 660 generating the one or more pixels.

In operation 1403, the microphone 670 of the client device 150 generates at least a portion of the media stored by the client device 150. For example, the microphone 670 may generate audio data (e.g., one or more audio samples) included within the audio content (e.g., an audio frame) within the media. In some example embodiments, operation 1410 may be performed based on the microphone 670 generating the audio data.

In operation 1405, the client device 150 (e.g., as configured by the media editor software 650 of the client device 150) receives software (e.g., client software in the form of an application, a plug-in for an application, an applet, or a mobile app), as noted above with respect to FIG. 6. When executed by the client device 150 (e.g., a processor of the client device 150), the software may configure the client device 150 as a client device of the media editing system 105. The software may be received from one or more machines of the media editing system 105 (e.g., render machine 110, storage machine 120, or source machine 130). Moreover, the software may configure the client device 150 to communicate with the media editing system 105, perform the method 1400 (e.g., according to various example embodiments), function as a render machine (e.g., as described above with respect to FIG. 2 and FIG. 9-10, or any suitable combination thereof. In some example embodiments, the media editor software 650 of the client device 150 receives the software from the media editing system 105 and uses the received software to configure the client device 150 as a client of the media editing system 105, as a render machine or a source machine (e.g., temporarily or permanently) of the media editing system 105, or any suitable combination thereof. According to various example embodiments, the received software may include one or more of the modules described above with respect to FIG. 2, FIG. 4, or FIG. 6. Moreover, the received software may configure the client device 150 to perform one or more of operations 1410, 1420, 1430, and 1440, as well as one or more of the operations described below with respect to FIG. 15.

In some example embodiments, the client device 150 is configured (e.g., by client software) to function as a render machine, a source machine, or both, in the context of the media editing system 105. For example, where the media stored by the client device 150 is unavailable from (e.g., permanently or temporarily absent from) any source machine within the media editing system 105, the client device 150 may function like the source machine 130, as described above with respect to FIG. 4. In addition, according to various example embodiments, the client device 150 may function like the render machine 110, as described above with respect to FIG. 2.

In operation 1407, the availability module 610 of the client device 150 detects that the media is stored by the client device 150. For example, the availability module 650 may determine that operation 1401, operation 1403, or both, have been performed by the client device 150. As another example, the availability module 610 may detect that the user 152 has marked the media as being available for access by one or more clients of the media editing system 105, by the media editing system 105 itself, or any suitable combination thereof. According to various example embodiments, operation 1410 may be performed in response to operation 1407. In some example embodiments, operation 1407 is performed by the media editor software 650 of the client device 150 (e.g., where client software is not yet downloaded to the client device 150).

Operation 1442 may be performed as part (e.g., a precursor task, a subroutine, or a portion) of operation 1440, in which the upload module 640 of the client device 150 communicates the media to the media editing system 105. In operation 1442, the upload module 640 sends a version of the media (e.g., a low-resolution version of the media) to the media editing system 105. This may be an initial version to be replaced with another version (e.g., an improvement to the initial version) at a later point in time.

In example embodiments that include operation 1442, operation 1444 may be performed as part of operation 1440 (e.g., subsequent to performance of operation 1442). In operation 1444, the upload module 640 of the client device 150 sends an improvement to the version of the media sent in operation 1442 (e.g., a high-resolution version of the media or additional media content that describes differences between the version sent in operation 1442 and a high quality version of the media).

As shown in FIG. 15, some example embodiments of the method 1400 may include one or more of operations 1510, 1520, and 1530. As noted above, the client device 150 may function like the render machine 110 (e.g., as described above with respect to FIG. 2), according to various example embodiments. Accordingly, one or more of the modules described above with respect to FIG. 2 (e.g., reception module 210, generation module 220, communication module 230, and determination module 240) may be included in the client device 150, for example, as configured by client software executing on the client device 150. Hence, the client device 150 (e.g., the provision module 630 of the client device 150) may perform one or more operations of the method 900, as described above with respect to FIG. 9-10 (e.g., operations 910, 930, 960, 1020, 1022, 1024, 1040, and 1050). For convenience, operations 1410, 1420, 1430, and 1440, which are described above with respect to FIG. 14, are also shown in FIG. 15.

In operation 1510, the provision module 630 of the client device 150 determines a resolution (e.g., high-resolution or low-resolution), a compression level, or both, of a media frame to be generated (e.g., based on a further media frame). The media frame may be requested to be generated according to a render request received by the client device 150. Operation 1510 may be performed based on an indicator of latency in the network 190 (e.g., accessed or received by the client device 150), an indicator of a data rate in a network 190 (e.g., accessed or received by the client device 150), or both. Moreover, the provision module 630 may determine the resolution, the compression level, or both, of the first media frame based on a position that the first media frame will occupy within a timeline (e.g., of a graphical user interface) presented by another client device (e.g., client device 160) that communicated the render request for generation of the media frame. For example, the render request may be communicated by the other client device (e.g., client device 160) based on (e.g., as a result of) media editor software (e.g., similar to the media editor software 650) executed or being executed by the other client device (e.g., executed to generate the media frame, executed to present the media frame, or any suitable combination thereof). In some example embodiments, operation 1510 may be performed in a manner similar to operation 1040, described above with respect to FIG. 10.

In operation 1520, the provision module 630 of the client device 150 generates the media frame (e.g., a first media frame) based on another media frame (e.g., a second media frame), which may be included in the media stored at the client device 150 (e.g., as detected in operation 1407). Generation of the media frame may be performed in accordance with a resolution, a compression level, or both, determined in operation 1510.

In operation 1530, the provision module 630 of the client device 150 provides the generated media frame (e.g., the first media frame) to a client device of the media editing system 105 (e.g., client device 160). For example, where the client device 160 communicated a render request for generation of the media frame, the provision module 630 of the client device 150 may provide the generated media frame to the client device 160. In certain example embodiments, operation 1530 may be performed in a manner similar to operation 960, described above with respect to FIG. 9.

According to various example embodiments, one or more of the methodologies described herein may facilitate collaborative editing of media by one or more client devices of the media editing system 105. Moreover, one or more of the methodologies described herein may facilitate resolution of conflicts between edits to a particular piece of media. Furthermore, one or more the methodologies described herein may facilitate provision of convenient access to media from a particular client device to one or more additional client devices. Hence, one or more the methodologies described herein may facilitate the editing of media in a collaborative fashion by multiple users of the media editing system 105.

When these effects are considered in aggregate, one or more of the methodologies described herein may obviate a need for certain efforts or resources that otherwise would be involved in identifying available media, editing media, managing conflicts between edits, and publishing the edited media. Efforts expended by a user in performing such tasks may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 16:
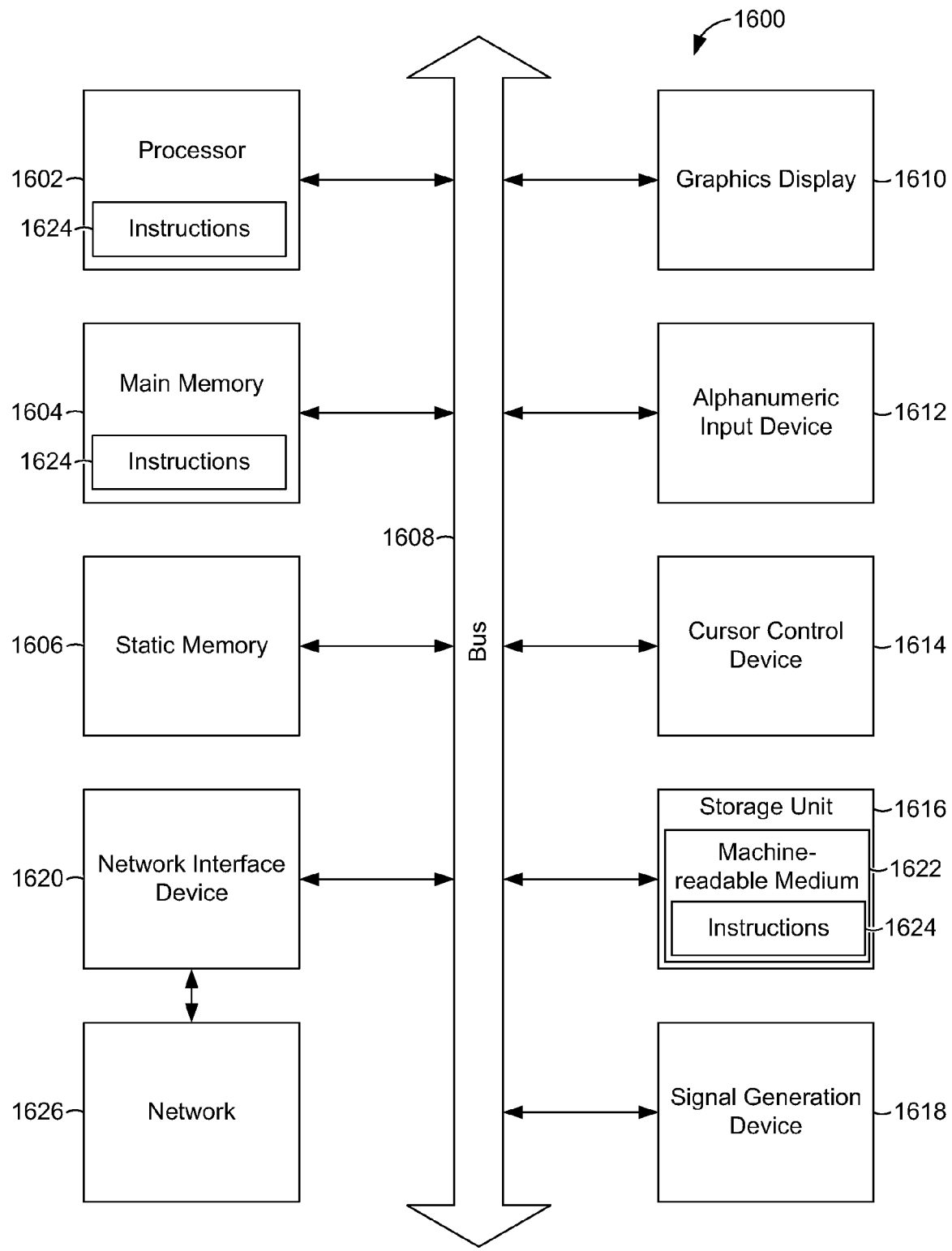
FIG. 16 is a block diagram illustrating components of a machine, according to some example embodiments, able to read instructions from a machine-readable medium and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system and within which instructions 1624 (e.g., software) for causing the machine 1600 to perform any one or more of the methodologies discussed herein may be executed. In alternative embodiments, the machine 1600 operates as a standalone device or may be connected (e.g., networked) to other machines. In a networked deployment, the machine 1600 may operate in the capacity of a server machine or a client machine in a server-client network environment, or as a peer machine in a peer-to-peer (or distributed) network environment. The machine 1600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1624 (sequentially or otherwise) that specify actions to be taken by that machine. Further, while only a single machine is illustrated, the term "machine" shall also be taken to include a collection of machines that individually or jointly execute the instructions 1624 to perform any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The machine 1600 may further include a graphics display 1610 (e.g., a plasma display panel (PDP), a light emitting diode (LED) display, a liquid crystal display (LCD), a projector, or a cathode ray tube (CRT)). The machine 1600 may also include an alphanumeric input device 1612 (e.g., a keyboard), a cursor control device 1614 (e.g., a mouse, a touchpad, a trackball, a joystick, a motion sensor, or other pointing instrument), a storage unit 1616, a signal generation device 1618 (e.g., a speaker), and a network interface device 1620.

The storage unit 1616 includes a machine-readable medium 1622 on which is stored the instructions 1624 (e.g., software) embodying any one or more of the methodologies or functions described herein. The instructions 1624 may also reside, completely or at least partially, within the main memory 1604, within the processor 1602 (e.g., within the processor's cache memory), or both, during execution thereof by the machine 1600. Accordingly, the main memory 1604 and the processor 1602 may be considered as machine-readable media. The instructions 1624 may be transmitted or received over a network 1626 (e.g., network 190) via the network interface device 1620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1600), such that the instructions, when executed by one or more processors of the machine (e.g., processor 1602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
    receiving a render request from a client device, the render request requesting that a first media frame be generated by applying a first set of edits to a second media frame stored by a source machine communicatively coupled to the client device, wherein the second media frame comprises at least one of a video frame or an audio frame;
    in response to receiving the render request, determining, by a processor, whether the client device is selected to generate the first media frame, wherein determining whether the client device is selected to generate the first media frame is based on a position within a media timeline to be associated with the first media frame, wherein the media timeline is associated with a media content accessed for editing by the client device;
    initiating generation of the first media frame by the client device when it is determined that the client device is selected to generate the first media frame, wherein the client device is selected to generate the first media frame when the position within the media timeline to be associated with the first media frame is near a current position indicated by the client device within the media timeline;
    initiating generation of the first media frame by a render machine communicatively coupled to the source machine when it is determined that the client device is not selected to generate the first media frame, wherein the render machine is configured to communicate the generated first media frame to the client device, and wherein the generation of the first media frame includes accessing the second media frame from the source machine to generate the first media frame, wherein the client device is not selected to generate the first media frame when the position to be associated with the first media frame is distant from the current position; and
    prior to publishing the first set of edits at a storage machine, determining whether the first set of edits to the second media frame conflicts with a second set of edits to the second media frame, and if a conflict is found, providing an indication of the conflict.

2. The computer-implemented method of claim 1, wherein:
    the determining of whether the client device is selected to generate the first media frame includes determining that the client device is selected to generate the first media frame, the render machine being available to generate the first media frame yet unselected to generate the first media frame.

3. The computer-implemented method of claim 2, wherein: the determining that the client device is selected to generate the first media frame is based on an indicator of latency in a network that communicatively couples the client device and the render machine.

4. The computer-implemented method of claim 2, wherein: the determining that the client device is selected to generate the first media frame is based on an indicator of a data rate in a network that communicatively couples the client device and the render machine.

5. The computer-implemented method of claim 2, wherein: the determining that the client device is selected to generate the first media frame is based on media editor software being executed by the client device to generate media content based on the second media frame, wherein the media editor software provides information regarding one or more of a client device processor capability, a client device memory capability, or a client device storage capability.

6. The computer-implemented method of claim 2, wherein: the determining that the client device is selected to generate the first media frame is based on media editor software being executed by the client device to present media content based on the second media frame.

7. The computer-implemented method of claim 1, wherein: the determining of whether the client device is selected to generate the first media frame includes determining that the render machine is selected to generate the first media frame, the client device being available to generate the first media frame yet unselected to generate the first media frame, wherein the render machine generates at least two versions of the first media frame, the at least two versions including a high-quality version that is stored at the storage machine and a compressed version that is communicated to the client device.

8. The computer-implemented method of claim 7, wherein: the determining that the render machine is selected to generate the first media frame is based on an indicator of latency in a network that communicatively couples the client device and the render machine.

9. The computer-implemented method of claim 7, wherein: the determining that the render machine is selected to generate the first media frame is based on an indicator of a data rate in a network that communicatively couples the client device and the render machine.

10. The computer-implemented method of claim 7, wherein: the determining that the render machine is selected to generate the first media frame is based on media editor software being executed by the client device to generate media content based on the second media frame, wherein the media editor software provides information regarding one or more of a client device processor capability, a client device memory capability, or a client device storage capability.

11. The computer-implemented method of claim 7, wherein: the determining that the render machine is selected to generate the first media frame is based on media editor software being executed by the client device to present media content based on the second media frame.

12. The computer-implemented method of claim 7 further comprising:

communicating the generated first media frame to the client device in response to the received render request.

13. The computer-implemented method of claim 1, wherein: the render request specifies that the second media frame be composited with a third media frame to generate the first media frame; and the generating of the first media frame includes compositing the second media frame with the third media frame stored by a further source machine communicatively coupled to the client device.

14. The computer-implemented method of claim 1, wherein: the render request specifies that the second media frame be modified by application of a media effect to generate the first media frame; and the generating of the first media frame includes applying the media effect to the second media frame.

15. The computer-implemented method of claim 1, wherein the client device is selected to generate the first media frame based on a determination that the client device provides a better playback performance than would be provided by the render machine, wherein the determination is based on the position within the media timeline to be associated with the first media frame being near the current position.

16. The computer-implemented method of claim 1, wherein the client device is not selected to generate the first media frame based on a determination that the render machine provides a higher quality first media frame than would be provided by the client device, wherein the determination is based on the position to be associated with the first media frame being distant from the current position.

17. A system comprising:
a media editing system server communicatively coupled to a plurality of client devices and configured to provide media editing services to the plurality of client devices, the plurality of client devices including a first client device and a second client device,
wherein the first client device is configured to access the media editing services at the media editing system server and to generate an availability notification indicating that media stored at the first client device is available,
wherein the second client device is configured to access the media editing services at the media editing system server and is communicatively coupled to the first client device, wherein the second client device generates a render request requesting that a first media frame be generated by applying a first set of edits to a second media frame comprising at least one of a video frame or an audio frame, wherein the second media frame is included in the media stored at the first client device, and wherein the second client device has a capability to generate the first media frame, and
wherein the media editing system server comprises one or more processors and computer storage memory having computer-executable instructions stored theron that, when executed by the one or more processors, implement a method comprising:
determining whether the second client device is selected to generate the first media frame, wherein determining whether the second client device is selected to generate the first media frame is based on a position within a media timeline to be associated with the first media frame, wherein the media timeline is associated with a media content accessed for editing by the second client device, and wherein the second client device is selected to generate the first media frame when the position within the media timeline to be associated with the first media frame is near a current position indicated by the second client device within the media timeline, based on determining that the second client device is not selected to generate the first media frame, rendering the first media frame, wherein the media editing system server is configured to communicate the generated first media frame to the second client device, and wherein the generation of the first media frame includes accessing the second media frame from the first client device to generate the first media frame, wherein the second client device is not selected to generate the first media frame when the position to be associated with the first media frame is distant from the current position, and communicating a message to at least one of the plurality of client devices, the message indicating a conflict between the first set of edits to the second media frame and a second set of edits to the second media frame, and receiving a response from the at least one of the plurality of client devices, the response indicating a resolution to the conflict.

18. The system of claim 17, wherein
the method comprises determining that the media editing system server is selected to generate the first media frame, the second client device being available to generate the first media frame yet unselected to generate the first media frame.

19. The system of claim 18, wherein
the method comprises determining that the media editing system server is selected to generate the first media frame based on an indicator of latency in a network that communicatively couples the second client device and the media editing system server.

20. The system of claim 18, wherein
the method comprises determining that the media editing system server is selected to generate the first media frame based on an indicator of a data rate in a network that communicatively couples the second client device and the media editing system server.

21. The system of claim 18, wherein
the method further comprises determining that the media editing system server is selected to generate the first media frame based on media editor software being executed by the second client device to generate media content based on the second media frame.

22. The system of claim 18, wherein
the method further comprises determining that the media editing system server is selected to generate the first media frame based on media editor software being executed by the second client device to present media content based on the second media frame.

23. The system of claim 18, wherein the method further comprises communicating the generated first media frame to the second client device in response to the received render request.

24. A system comprising:
one or more processors; and
computer storage memory having computer-executable instructions stored thereon that, when executed by the one or more processors, implement a method comprising:
receiving a render request from a client device, the render request requesting that a first media frame be generated based on a second media frame that is stored by a source machine communicatively coupled to the client device, wherein the second media frame comprises at least one of a video frame or an audio frame, determining whether the client device is selected to generate the first media frame, a render machine communicatively coupled to the source machine being available to generate the first media frame and being configured to communicate the generated first media frame to the client device, wherein determining whether the client device is selected to generate the first media frame is based on a position within a media timeline to be associated with the first media frame, wherein the media timeline is associated with a media content accessed for editing by the client device, initiating generation of the first media frame based on the determining of whether the client device is selected to generate the first media frame, the generation of the first media frame including accessing the second media frame from the source machine and generating the first media frame based on the second media frame in accordance with the received render request, wherein the client device is selected to generate the first media frame when the position within the media timeline to be associated with the first media frame is near a current position indicated by the client device within the media timeline, and wherein the client device is not selected to generate the first media frame when the position to be associated with the first media frame is distant from the current position, and communicating a message indicating a conflict among a plurality of edits that are to be applied to the second media frame in order to generate the first media frame and receiving a response indicating a resolution to the conflict.

25. The system of claim 24, wherein
the method further comprises determining that the client device is selected to generate the first media frame, the render machine being available to generate the first media frame yet unselected to generate the first media frame.

* * * * *